(12) United States Patent
Xu et al.

(10) Patent No.: US 12,069,495 B2
(45) Date of Patent: Aug. 20, 2024

(54) METHODS FOR REDUCING COMPLEXITY WITH COUNTING CONTROL CHANNEL CANDIDATES AND CONTROL CHANNEL ELEMENTS

(71) Applicant: QUALCOMM Incorporated, San Diego, CA (US)

(72) Inventors: Huilin Xu, Temecula, CA (US); Haobing Zhu, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/569,188

(22) Filed: Jan. 5, 2022

(65) Prior Publication Data

US 2023/0217278 A1 Jul. 6, 2023

(51) Int. Cl.
*H04W 24/08* (2009.01)
*H04W 72/0446* (2023.01)
*H04W 72/0453* (2023.01)
*H04W 72/23* (2023.01)

(52) U.S. Cl.
CPC ....... *H04W 24/08* (2013.01); *H04W 72/0446* (2013.01); *H04W 72/0453* (2013.01); *H04W 72/23* (2023.01)

(58) Field of Classification Search
CPC . H04W 24/08; H04W 72/0446; H04W 72/23; H04W 72/0453; H04L 5/0053
See application file for complete search history.

(56) References Cited

U.S. PATENT DOCUMENTS

| | | | | |
|---|---|---|---|---|
| 10,644,860 B2* | 5/2020 | Seo | .......................... | H04L 5/001 |
| 11,337,238 B2* | 5/2022 | Nakashima | ........... | H04W 72/23 |
| 11,737,081 B2* | 8/2023 | Moon | ................... | H04L 1/0038 |
| | | | | 370/329 |
| 11,950,230 B2* | 4/2024 | He | ......................... | H04W 24/08 |
| 2014/0133425 A1* | 5/2014 | Kim | ...................... | H04L 5/0053 |
| | | | | 370/329 |
| 2022/0216972 A1* | 7/2022 | Takeda | ................... | H04W 24/08 |
| 2023/0422067 A1* | 12/2023 | Kwak | ................... | H04W 24/08 |

* cited by examiner

*Primary Examiner* — Brian D Nguyen
(74) *Attorney, Agent, or Firm* — Guang Yu Zhang; Holland & Hart LLP

(57) ABSTRACT

Methods, systems, and devices for wireless communications are described. For instance, a user equipment (UE) may receive a configuration of a set of search space sets for a downlink control channel. The UE may determine a quantity of downlink control channel units (e.g., downlink control channel elements, downlink control channel candidates) for monitoring over the set of search space sets, where downlink control channel units that overlap may be counted separately. For instance, the downlink control channel units may overlap in time and frequency and/or may have a same associated payload size and associated set of control channel elements. The UE may monitor the downlink control channel according to a subset of the set of search space sets, where the subset excludes one or more of the set of search space sets based on the quantity of downlink control channel units satisfying a threshold.

30 Claims, 12 Drawing Sheets

METHODS FOR REDUCING COMPLEXITY WITH COUNTING CONTROL CHANNEL CANDIDATES AND CONTROL CHANNEL ELEMENTS

FIELD OF TECHNOLOGY

The following relates to wireless communications, including methods for reducing complexity with counting control channel candidates and control channel elements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a user equipment (UE) may monitor for physical downlink control channel (PDCCH) transmissions over multiple search space sets. In some examples, a total quantity of control channel elements (CCEs) or PDCCH candidates over which the UE monitors may exceed a threshold, which may be referred to as overbooking. Overbooking may present challenges in PDCCH monitoring.

SUMMARY

The described techniques relate to improved methods, systems, devices, and apparatuses that support methods for reducing complexity with counting control channel candidates and control channel elements. Generally, the described techniques provide for a UE to decrease latency associated with checking whether downlink control channel units (e.g., control channel elements or control channel candidates) exceed a threshold. For instance, a UE may receive a configuration of a set of search space sets for a downlink control channel. The UE may determine a quantity of downlink control channel units (e.g., downlink control channel elements, downlink control channel candidates) for monitoring over the set of search space sets, where downlink control channel units that overlap may be counted separately. For instance, the downlink control channel units may overlap in time and frequency and/or may have a same associated payload size and associated set of control channel elements. The UE may monitor the downlink control channel according to a subset of the set of search space sets, where the subset excludes one or more of the set of search space sets based on the quantity of downlink control channel units satisfying a threshold.

A method for wireless communication at a user equipment (UE) is described. The method may include receiving a configuration of a set of multiple search space sets for a downlink control channel, determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates, and monitoring the downlink control channel according to a subset of the set of multiple search space sets, where the subset of the set of multiple search space sets excludes one or more of the set of multiple search space sets based on the quantity of downlink control channel candidates satisfying a threshold.

An apparatus for wireless communication at a UE is described. The apparatus may include a processor, memory coupled with the processor, and instructions stored in the memory. The instructions may be executable by the processor to cause the apparatus to receive a configuration of a set of multiple search space sets for a downlink control channel, determine a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates, and monitor the downlink control channel according to a subset of the set of multiple search space sets, where the subset of the set of multiple search space sets excludes one or more of the set of multiple search space sets based on the quantity of downlink control channel candidates satisfying a threshold.

Another apparatus for wireless communication at a UE is described. The apparatus may include means for receiving a configuration of a set of multiple search space sets for a downlink control channel, means for determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates, and means for monitoring the downlink control channel according to a subset of the set of multiple search space sets, where the subset of the set of multiple search space sets excludes one or more of the set of multiple search space sets based on the quantity of downlink control channel candidates satisfying a threshold.

A non-transitory computer-readable medium storing code for wireless communication at a UE is described. The code may include instructions executable by a processor to receive a configuration of a set of multiple search space sets for a downlink control channel, determine a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates, and monitor the downlink control channel according to a subset of the set of multiple search space sets, where the subset of the set of multiple search space sets excludes one or more of the set of multiple search space sets based on the quantity of downlink control channel candidates satisfying a threshold.

In some examples of the method, apparatuses, and non-transitory computer-readable medium described herein, the configuration includes a set of multiple control resource sets and the first downlink control channel candidate and the second downlink control channel candidate may be each associated with a first control resource set of the set of multiple control resource sets.

In some examples of the method, apparatuses, and non-transitory computer-readable medium described herein, determining the quantity of downlink control channel candidates may include operations, features, means, or instructions for determining the quantity of downlink control channel candidates based on a respective aggregation level for each search space set of the set of multiple search space sets.

In some examples of the method, apparatuses, and non-transitory computer-readable medium described herein, determining the quantity of downlink control channel candidates may include operations, features, means, or instructions for determining, for each search space set of the set of multiple search space sets, a respective second quantity of downlink control channel candidates based on the respective aggregation level and a respective total quantity of control channel elements for the search space set and aggregating the respective second quantity of downlink control channel candidates for each search space set of the set of multiple search space sets to calculate the quantity of downlink control channel candidates.

In some examples of the method, apparatuses, and non-transitory computer-readable medium described herein, the respective second quantity of downlink control channel candidates for each search space set of the set of multiple search space sets may be determined based on dividing the respective total quantity of control channel elements by the respective aggregation level.

In some examples of the method, apparatuses, and non-transitory computer-readable medium described herein, the respective second quantity of downlink control channel candidates may be based on a minimum between the respective total quantity of control channel elements divided by the respective aggregation level and a respective total quantity of downlink control channel candidates configured for the search space set.

In some examples of the method, apparatuses, and non-transitory computer-readable medium described herein, the first downlink control channel candidate may be associated with a first search space set of the set of multiple search space sets and the second downlink control channel candidate may be associated with a second search space set of the set of multiple search space sets.

In some examples of the method, apparatuses, and non-transitory computer-readable medium described herein, the first downlink control channel candidate and the second downlink control channel candidate may be each associated with a first search space set of the set of multiple search space sets.

In some examples of the method, apparatuses, and non-transitory computer-readable medium described herein, each of the excluded one or more search space sets may be UE-specific.

In some examples of the method, apparatuses, and non-transitory computer-readable medium described herein, the subset of the set of multiple search space sets includes one or more additional UE-specific search space sets distinct from the excluded one or more search space sets and one or more second search space sets common to multiple UEs.

A method for wireless communication at a UE is described. The method may include receiving a configuration of a set of multiple search space sets for a downlink control channel, determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements, and monitoring the downlink control channel according to a subset of the set of multiple search space sets, where the subset of the set of multiple search space sets excludes one or more of the set of multiple search space sets based on the quantity of downlink control channel elements satisfying a threshold.

An apparatus for wireless communication at a UE is described. The apparatus may include a processor, memory coupled with the processor, and instructions stored in the memory. The instructions may be executable by the processor to cause the apparatus to receive a configuration of a set of multiple search space sets for a downlink control channel, determine a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements, and monitor the downlink control channel according to a subset of the set of multiple search space sets, where the subset of the set of multiple search space sets excludes one or more of the set of multiple search space sets based on the quantity of downlink control channel elements satisfying a threshold.

Another apparatus for wireless communication at a UE is described. The apparatus may include means for receiving a configuration of a set of multiple search space sets for a downlink control channel, means for determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements, and means for monitoring the downlink control channel according to a subset of the set of multiple search space sets, where the subset of the set of multiple search space sets excludes one or more of the set of multiple search space sets based on the quantity of downlink control channel elements satisfying a threshold.

A non-transitory computer-readable medium storing code for wireless communication at a UE is described. The code may include instructions executable by a processor to receive a configuration of a set of multiple search space sets for a downlink control channel, determine a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements, and monitor the downlink control channel according to a subset of the set of multiple search space sets, where the subset of the set of multiple search space sets excludes one or more of the set of multiple search space sets based on the quantity of downlink control channel elements satisfying a threshold.

In some examples of the method, apparatuses, and non-transitory computer-readable medium described herein, the first downlink control channel element and the second downlink control channel element may be each associated with a first search space set of the set of multiple search space sets.

Some examples of the method, apparatuses, and non-transitory computer-readable medium described herein may further include operations, features, means, or instructions for receiving a second configuration of a set of multiple control resource sets for the downlink control channel, where the first downlink control channel element may be associated with a first search space set of the set of multiple search space sets and a first control resource set of the set of multiple control resource sets, and where the second downlink control channel element may be associated with a second search space set of the set of multiple search space sets and the first control resource set.

In some examples of the method, apparatuses, and non-transitory computer-readable medium described herein, the first downlink control channel element and the second downlink control channel element may be associated with a same downlink control channel starting symbol.

In some examples of the method, apparatuses, and non-transitory computer-readable medium described herein, each of the excluded one or more search space sets may be UE-specific.

DETAILED DESCRIPTION

A user equipment (UE) may be configured to monitor for physical downlink control channel (PDCCH) transmissions over a set of configured search space sets. Each search space set may be included in a corresponding control resource set (CORESET) and may include a respective one or more PDCCH candidates. Each PDCCH candidate of a configured search space set may have a respective set of control channel elements (CCEs) and a respective downlink control information (DCI) payload size. In some examples, the total quantity of PDCCH candidates or a total quantity of CCEs over which the UE performs monitoring may exceed a respective limit, which may be referred to as a blind decode (BD) limit and a CCE limit, respectively. If the UE detects that either of these limits are exceeded, the UE may perform PDCCH overbooking handling. PDCCH overbooking handling may include dropping search space sets from the set of search space sets over which the UE is configured to monitor. In some examples, checking if the BD limit or the CCE limit is exceeded may have an associated latency due to a complexity associated with the BD limit or the CCE limit. Techniques that decrease the complexity may decrease the latency in at least some examples. Accordingly, such techniques may increase the efficiency of wireless communications.

The present disclosure may describe one or more techniques to decrease the computational complexity associated with checking whether the BD limit or the CCE limit is exceeded. For instance, when determining a total quantity of PDCCH candidates, the UE may count PDCCH candidates of a same CORESET that have the same DCI size and the same associated set of CCEs separately. Additionally or alternatively, when determining a total quantity of CCEs, the UE may count overlapping CCEs within a same CORESET separately. Generally, counting PDCCH candidates with same DCI size and same CCEs as the same PDCCH candidate and/or counting overlapping CCEs as the same CCE may have a higher associated computational complexity than counting such PDCCH candidates and/or overlapping CCEs separately. The higher computational complexity, for instance, may be due to operations performed by the UE to account for PDCCH candidates that have the same DCI size and same CCEs and/or that account for overlapping CCEs. Accordingly, counting such PDCCH candidates and/or CCEs separately may avoid these operations, which may decrease complexity and may increase the efficiency of wireless communications in at least some examples.

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to methods for reducing complexity with counting control channel candidates and control channel elements.

Figure 1:
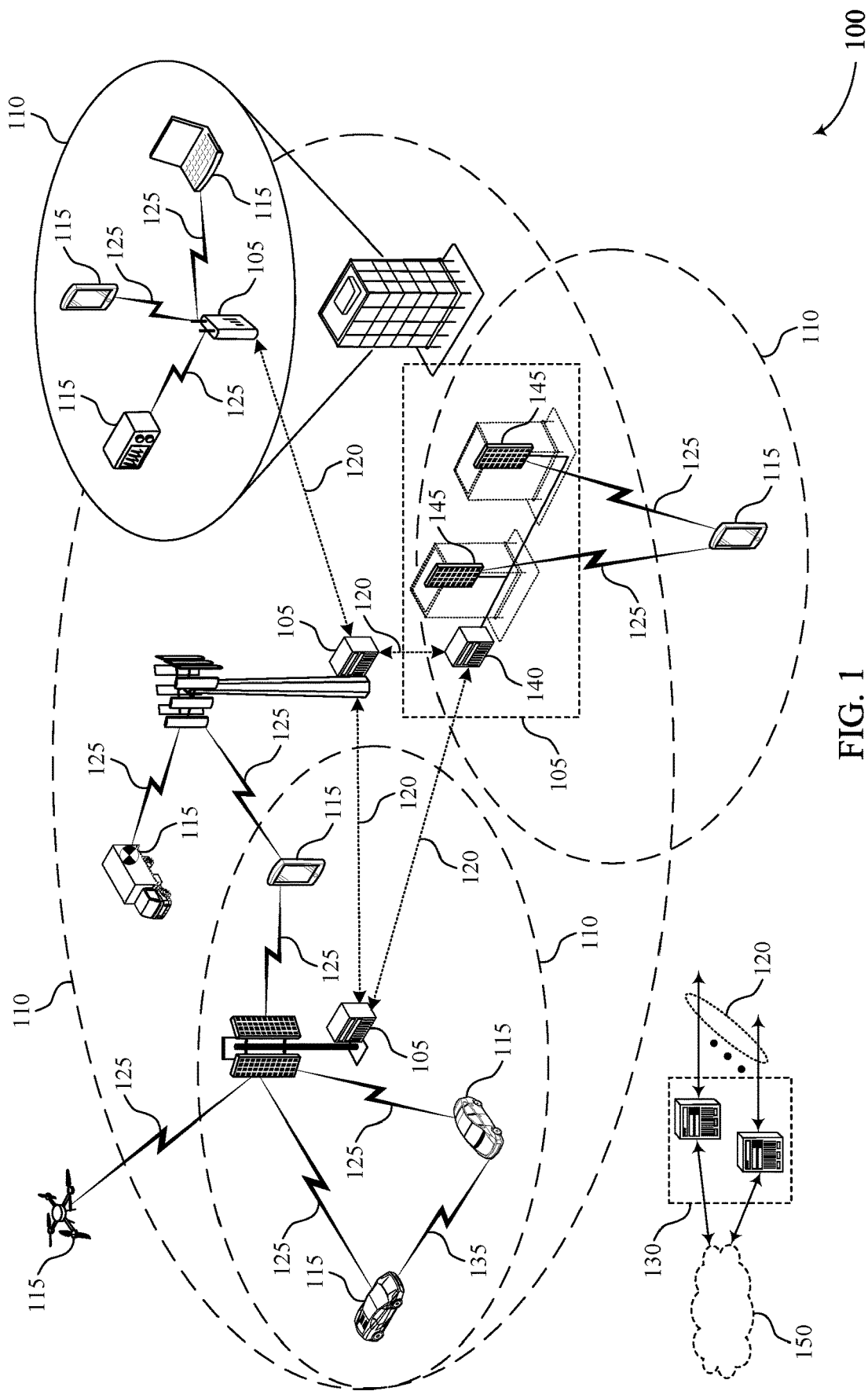
FIG. 1 illustrates an example of a wireless communications system that supports methods for reducing complexity with counting control channel candidates and control channel elements in accordance with aspects of the present disclosure.

FIG. 1 illustrates an example of a wireless communications system 100 that supports methods for reducing complexity with counting control channel candidates and control channel elements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UE 115 may be configured to monitor for PDCCH transmissions over a set of configured search space sets. Each search space set may be included in a corresponding CORESET and may include a respective one or more PDCCH candidates. Each PDCCH candidate of a configured search space set may have a respective set of CCEs and a respective DCI payload size. In some examples, the total quantity of PDCCH candidates or a total quantity of CCEs over which the UE 115 performs monitoring may exceed a respective limit, which may be referred to as a BD limit and a CCE limit, respectively. If the UE detects that either of these limits are exceeded, the UE 115 may perform PDCCH overbooking handling. PDCCH overbooking handling may include dropping search space sets from the set of search space sets over which the UE 115 is configured to monitor. In some examples, checking if the BD limit or the CCE limit is exceeded may have an associated latency due to a complexity associated with the BD limit or the CCE limit. Techniques that decrease the complexity may decrease the latency in at least some examples. Accordingly, such techniques may increase the efficiency of wireless communications.

The present disclosure may describe one or more techniques to decrease the computational complexity associated with checking whether the BD limit or the CCE limit is exceeded. For instance, when determining a total quantity of PDCCH candidates, the UE 115 may count PDCCH candidates of a same CORESET that have the same DCI size and the same associated set of CCEs separately. Additionally or alternatively, when determining a total quantity of CCEs, the UE 115 may count overlapping CCEs within a same CORESET separately. Generally, counting PDCCH candidates with same DCI size and same CCEs as the same PDCCH candidate and/or counting overlapping CCEs as the same CCE may have a higher associated computational complexity than counting such PDCCH candidates and/or overlapping CCEs separately. The higher computational complexity, for instance, may be due to operations performed by the UE 115 to account for PDCCH candidates that have the same DCI size and same CCEs and/or that account for overlapping CCEs. Accordingly, counting such PDCCH candidates and/or CCEs separately may avoid these operations, which may decrease complexity and may increase the efficiency of wireless communications in at least some examples.

Figure 2:
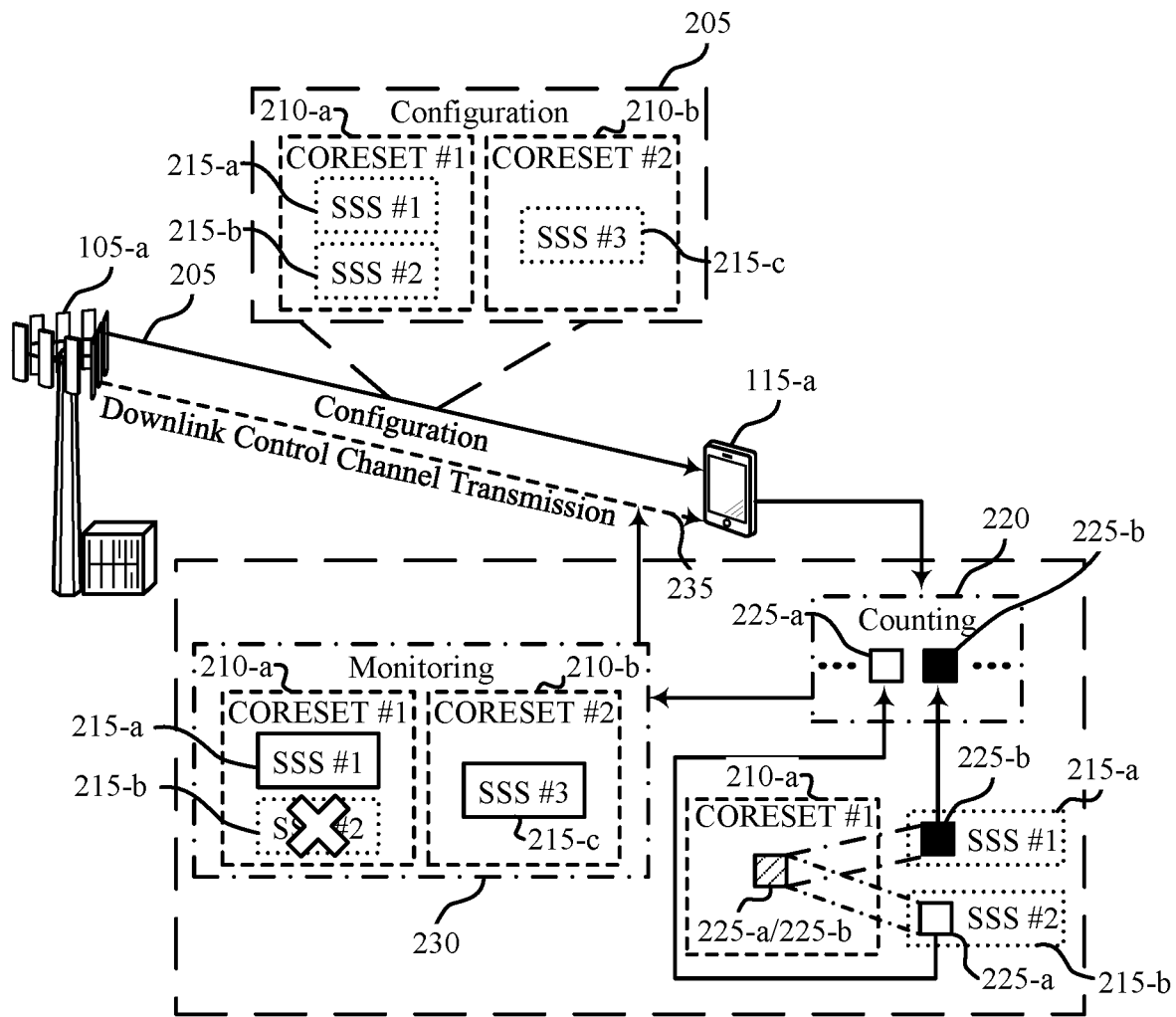
FIG. 2 illustrates an example of a wireless communications system that supports methods for reducing complexity with counting control channel candidates and control channel elements in accordance with aspects of the present disclosure.
Figure 3:
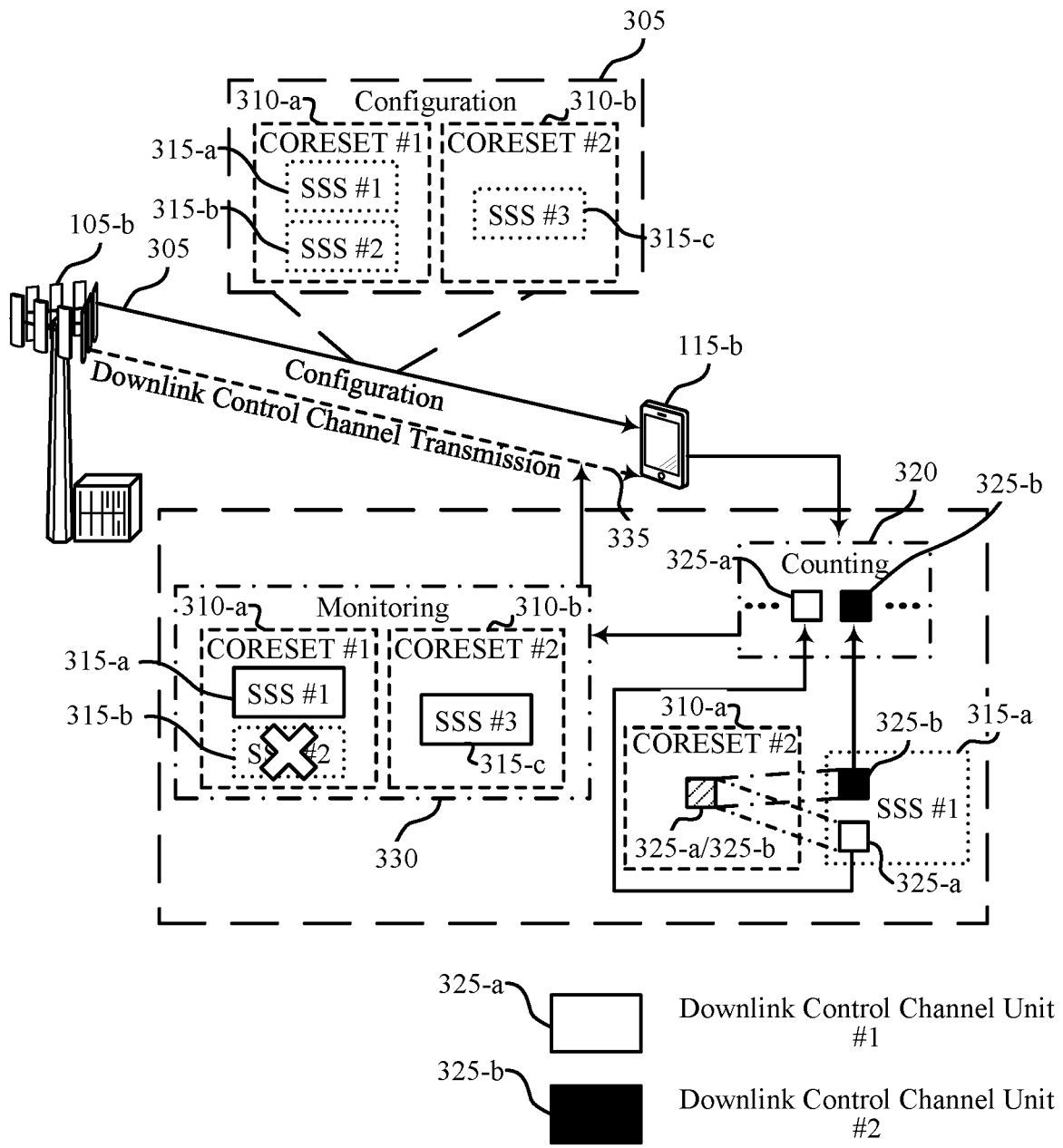
FIG. 3 illustrates an example of a wireless communications system that supports methods for reducing complexity with counting control channel candidates and control channel elements in accordance with aspects of the present disclosure.

FIGS. 2 and 3 illustrate examples of wireless communications systems 200 and 300 that support methods for reducing complexity with counting control channel candidates and control channel elements in accordance with aspects of the present disclosure. In some examples, wireless communications systems 200 and 300 may implement one or more aspects of wireless communications system 100. For instance, UEs 115-a and 115-b may be examples of UEs 115 as described with reference to FIG. 1 and base stations 105-a and 105-b may be examples of base stations 105 as described with reference to FIG.

In some examples, a total number of CCEs or of PDCCH blind decodes (BDs) may be subject to respective limits, referred to as the CCE limit and the BD limit, respectively. Channel estimation complexity for UE 115-a and/or UE 115-b may be dependent on the number of CCEs to be processed and UE decoding complexity may be dependent on the number of BDs to be processed. BDs may differ from non-blind decodes because in BDs UE 115-a and/or UE 115-b may not receive signaling indicating explicitly whether a PDCCH transmission is transmitted over a PDCCH candidate, which may be a set of control resources used to carry an entire PDCCH transmission.

If configured PDCCH candidates exceed either the CCE or the BD limit (e.g., based on a PDCCH configuration at UE 115-a and/or UE 115-b), PDCCH overbooking may occur. In some such examples, UE 115-a and/or UE 115-b may drop search space sets that are UE-specific (e.g., specific to UE 115-a and/or UE 115-b) and may prioritize search space sets that are common to multiple UEs (e.g., UE 115-a and/or UE 115-b as well as at least one other UE 115). Additionally, UE 115-a and/or UE 115-b may drop UE-specific search space sets starting from a highest index UE-specific search space set and sequentially towards a lowest index UE-specific specific search space set until the remaining search space sets are below or at the CCE limit or the BD limit. The procedure of dropping search space sets may be referred to as PDCCH overbooking handling.

In some examples, the complexity of overbooking handling may be at least partially due to checking the overlapping CCEs of PDCCH candidates. In one example, UE 115-a and/or UE 115-b may allocate CCEs in a CORESET for each PDCCH candidate. For instance, for a search space set s associated with CORESET p, the CCE indexes for aggregation level L corresponding to PDCCH candidates $m_{s,n_{CI}}$ of the search space slot in slot $n_{s,f}^\mu$ for an active downlink bandwidth part of a serving cell corresponding to a carrier indicator field value $n_{CI}$ may be given by $$L*\left\{\left(Y_{p,n_{s,f}^\mu}+\left\lfloor\frac{m_{s,n_{CI}}*N_{CCE,p}}{L*M_{s,max}^{(L)}}\right\rfloor+n_{CI}\right)\bmod\left\lfloor\frac{N_{CCE,p}}{L}\right\rfloor\right\}+i$$

(e.g., a CCE allocation function), where, for any common search space $Y_{p,n_{s,f}}^\mu=0$, and for a UE-specific search space $Y_{p,n_{s,f}}^\mu=(A_p*Y_{p,n_{s,f}-1}^\mu)\bmod(D)$. In some such examples, $Y_{p,-1}=n_{RNTI}\neq 0$, $A_p=39827$ for pmod3=0, $A_p=39829$ for pmod3=1, $A_p=39839$ for pmod3=2, and D=65537. Additionally, i may have a value from 0 to L−1 and $N_{CCE,p}$ may be the number of CCEs from 0 to $N_{CCE,p}-1$ in CORESET p and, if any, per resource block (RB) set. In some examples, $n_{CI}$ may be a carrier indictor field if UE 115-a and/or UE 115-b is configured with a carrier indicator field by CrossCarrierSchedulingConfig for the serving cell on which a PDCCH transmission (e.g., otherwise, such as for a common search space, $n_{CI}$ may equal 0). In some examples, $m_{s,n_{CI}}=0,\ldots,M_{s,n_{CI}}^{(L)}-1$, where $M_{s,n_{CI}}^{(L)}$ may be the number of PDCCH candidates that UE 115-a is configured to monitor for aggregation level L of a search space set s for a serving cell corresponding to $n_{CI}$. Additionally, for each common search space, $M_{s,max}^{(L)}=M_{s,0}^{(L)}$. Additionally, for a UE-specific search space, $M_{s,max}^{(L)}$ may be equal to a maximum of $M_{s,n_{CI}}^{(L)}$ over each configured $n_{CI}$ for a CCE aggregation level L of search space set s. In some examples, the RNTI value used for $n_{RNTI}$ may be the cell RNTI (C-RNTI). Additionally, a CORESET configuration may provide RBs and a number of symbols for PDCCH monitoring occasions, whereas search space set configurations may provide a starting symbol and a periodicity of PDCCH monitoring occasions. A PDCCH monitoring occasion may be an instance of a search space set. One or more multiple of the search space sets may be associated with a same CORESET.

In some examples, performing PDCCH overbooking handling by computing the CCE allocation function and/or the hashtag function Y may consume above a threshold number of software cycles, may not enable UE 115-a and/or UE 115-b to perform pipelining in PDCCH overbooking handling, or both. Additionally, in at least some examples, the network (e.g., base station 105-a and/or base station 105-b) may handle PDCCH overbooking to ensure the PDCCH configuration at UE 115-a and/or UE 115-b does not cause overbooking. Accordingly, UE 115-a and/or UE 115-b may simplify overbooking handling (e.g., UE 115-a and/or UE 115-b may refrain from computing the CCE allocation function and/or the hashing function Y when performing overbooking handling). Simplifying the overbooking handling may enable UE 115-a and/or UE 115-b (e.g., a reduced capacity (RedCap) UE) to perform overbooking handling with a lower complexity. and/or with a lower latency, which may increase the efficiency of wireless communications.

In FIG. 2, base station 105-a may transmit a configuration 205 of search space sets to UE 115-a. For instance, the configuration 205 may indicate a first search space set 215-a, a second search space set 215-b, and a third search space set 215-c. In some examples, the configuration 205 may also indicate a set of CORESETs. For instance, the configuration 205 may include CORESET 210-a that includes first search space set 215-a and second search space set 215-b as well as CORESET 210-b that includes third search space set 215-c.

At 220, UE 115-a may determine (e.g., count) a quantity of downlink control channel units (e.g., PDCCH candidates, CCEs) for monitoring over the search space sets. In some examples, UE 115-a may count separately downlink control channel units of a same CORESET that overlap. For instance, first downlink control channel unit 225-a and second downlink control channel unit 225-b may overlap and may be counted separately at 220. If first downlink control channel unit 225-a and second downlink control channel unit 225-b are PDCCH candidates, overlapping may refer to the PDCCH candidates having a same DCI size and/or a same set of associated CCEs. Alternatively, if first downlink control channel unit 225-a and second downlink control channel unit 225-b are CCEs, overlapping may refer to the CCEs overlapping in time and frequency. In some examples, downlink control channel unit 225-a may be in search space set 215-a and downlink control channel unit 225-b may be in search space set 215-b.

After determining the quantity of downlink control channel units (e.g., PDCCH candidates, CCEs) at 220, UE 115-a may proceed to 230. At 230, UE 115-a may monitor the downlink control channel according to a subset of the search space sets. In examples in which the quantity of downlink control channel units exceeds a threshold (e.g., PDCCH candidates exceed a BD threshold, CCEs exceed a CCE threshold), the subset may exclude one or more of the search space sets. For instance, the subset may include first search space set 215-a and third search space set 215-c, but may exclude second search space set 215-b. In some examples, the subset may exclude second search space set 215-b based on second search space set 215-b being a UE-specific search space set (e.g., whereas first search space set 215-a and third search space set 215-c may be common search space sets), second search space set 215-b being associated with a higher index (e.g., whereas first search space set 215-a and third search space set 215-c may be associated with a lower index), or any combination thereof. In some examples, UE 115-a may receive downlink control channel transmission 235 (e.g., from base station 105-a) over first search space set 215-a or third search space set 215-c based on the monitoring at 230.

In FIG. 3, base station 105-b may transmit a configuration 305 of search space sets to UE 115-b. For instance, the configuration 305 may indicate a first search space set 315-a, a second search space set 315-b, and a third search space set 315-c. In some examples, the configuration 305 may also indicate a set of CORESETs. For instance, the configuration 305 may include CORESET 310-a that includes first search space set 315-a and second search space set 315-b as well as CORESET 310-b that includes third search space set 315-c.

At 320, UE 115-b may determine (e.g., count) a quantity of downlink control channel units (e.g., PDCCH candidates, CCEs) for monitoring over the search space sets. In some examples, UE 115-b may count separately downlink control channel units of a same CORESET that overlap. For instance, first downlink control channel unit 325-a and second downlink control channel unit 325-b may overlap and may be counted separately at 320. If first downlink control channel unit 325-a and second downlink control channel unit 325-b are PDCCH candidates, overlapping may refer to the PDCCH candidates having a same DCI size and/or a same set of associated CCEs. Alternatively, if first downlink control channel unit 325-a and second downlink control channel unit 325-b are CCEs, overlapping may refer to the CCEs overlapping in time and frequency. In some examples, each of downlink control channel unit 325-a and downlink control channel unit 325-b may be in search space set 315-a.

After determining the quantity of downlink control channel units (e.g., PDCCH candidates, CCEs) at 320, UE 115-b may proceed to 330. At 330, UE 115-b may monitor the downlink control channel according to a subset of the search space sets. In examples in which the quantity of downlink control channel units exceeds a threshold (e.g., PDCCH candidates exceed a BD threshold, CCEs exceed a CCE threshold), the subset may exclude one or more of the search space sets. For instance, the subset may include first search space set 315-a and third search space set 315-c, but may exclude second search space set 315-b. In some examples, the subset may exclude second search space set 315-b based on second search space set 315-b being a UE-specific search space set (e.g., whereas first search space set 315-a and third search space set 315-c may be common search space sets), second search space set 315-b being associated with a higher index (e.g., whereas first search space set 315-a and third search space set 315-c may be associated with a lower index), or any combination thereof. In some examples, UE 115-b may receive downlink control channel transmission 335 (e.g., from base station 105-b) over first search space set 315-a or third search space set 315-c based on the monitoring at 330.

The techniques described in the present disclosure may be associated with one or more advantages. For instance, counting separately overlapping CCEs and/or PDCCH candidates with the same DCI size and the same set of CCEs may enable UE 115-a and/or UE 115-b to more quickly determine a total number of CCEs and/or a total number of BDs, respectively, as compared to counting such CCEs and/or PDCCH candidates as one CCE and/or one PDCCH candidate. Thus, the latency associated with PDCCH overbooking handling may decrease and the efficiency of wireless communications may increase.

Figure 4:
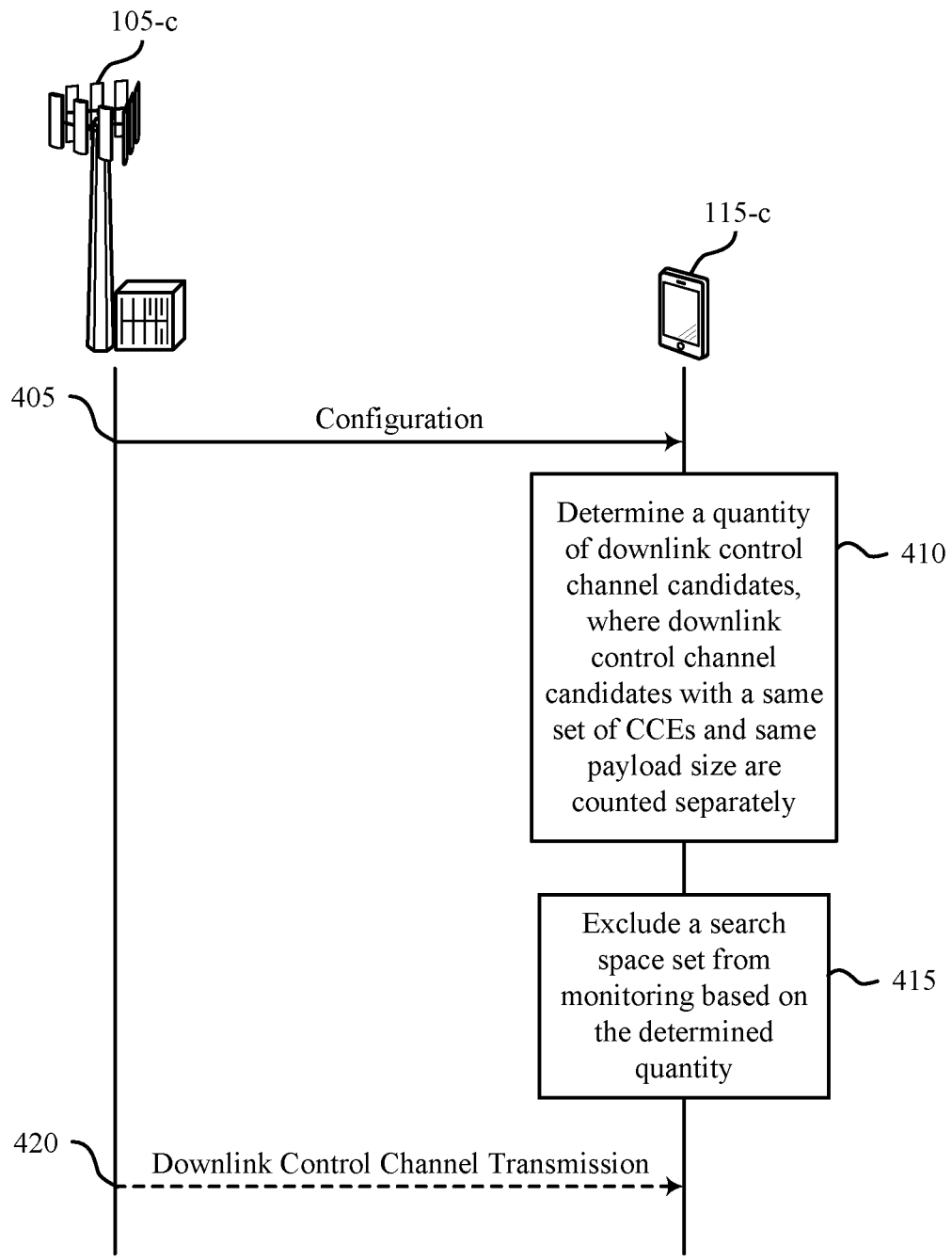
FIG. 4 illustrates an example of a process flow that supports methods for reducing complexity with counting control channel candidates and control channel elements in accordance with aspects of the present disclosure.

FIG. 4 illustrates an example of a process flow 400 that supports methods for reducing complexity with counting control channel candidates (e.g., PDCCH candidates) and control channel elements in accordance with aspects of the present disclosure. In some examples, FIG. 4 may be implemented by one or more aspects of wireless communications systems 100, 200, or 300. For instance, base station 105-c may be an example of a base station 105 as described with reference to FIG. 1, a base station 105-*a* as described with reference to FIG. 2, a base station 105-*b* as described with reference to FIG. 3, or any combination thereof. Similarly, UE 115-*c* may be an example of a UE 115 as described with reference to FIG. 1, a UE 115-*a* as described with reference to FIG. 2, a UE 115-*b* as described with reference to FIG. 3, or any combination thereof.

In some examples, PDCCH candidates in different CORESETs may be counted as separate BDs, but PDCCH candidates across search space sets within the CORESET may be counted as a same BD. In some such examples, UE 115-*c* may count the BD across search space sets sequentially and may check an overlapping condition (e.g., same set of CCEs) across search space sets. However, by counting sequentially and/or checking the overlapping condition, UE 115-*c* may count BDs with a greater latency than if refraining from checking the overlapping condition. For instance, if UE 115-*c* determines that PDCCH candidates in different search space sets associated with the same CORESET are counted as separate blind decodes, including in examples in which these PDCCH candidates have the same DCI payload size and include the same set of CCEs, UE 115-*c* may refrain from checking the overlapping condition (e.g., determining the CCE allocation function and the hashing function Y as described in FIG. 2) when counting the BDs.

In some examples, PDCCH candidates having the same DCI payload and including the same set of CCEs in the same search space set (e.g., and the same CORESET) may be counted as separate blind decodes. Additionally, in some examples, it may be undesirable for fully overlapping PDCCH candidates with the same aggregation level to be counted as separate blind decodes. In some such examples, base station 105-*c* may configure UE 115-*c* with search space sets that are configured such that the corresponding PDCCH candidates with the same aggregation do not fully overlap with each other. Alternatively, UE 115-*c* may perform a computation to ensure that fully overlapping PDCCH candidates with the same aggregation level are counted as the same PDCCH candidate. In some examples, for a search space set and an aggregation level L, the number of BDs for configured PDCCH candidates of a search space set may be determined by a floor of a number of CCEs configured in the associated CORESET divided by the aggregation level L. Additionally or alternatively, for a search space set, for an aggregation L, the number of BDs for configured PDCCH candidate of the search space set may be determined by a minimum between the number of PDCCH candidates in the search space set and a floor of the number of CCEs configured in associated CORESET divided by the aggregation level L.

At 405, base station 105-*c* may transmit, to UE 115-*c*, a configuration of a set of search space sets for a downlink control channel.

At 410, UE 115-*c* may determine a quantity of downlink control channel candidates (e.g., PDCCH candidates) for monitoring over the set of search space sets, where a first downlink control channel candidates associated with a first set of CCEs and a first payload size (e.g., a first DCI size) and a second downlink control channel candidate associated with the first set of CCEs and the first payload size are each counted separately in the quantity of downlink control channel candidates. In some examples, determining the quantity of downlink control channel candidates may include determining the quantity based on a respective aggregation level (e.g., L) for each search space set of the set of search space sets. Additionally, determining the quantity may include determining, for each search space set of the set of search space sets, a respective second quantity of downlink control channel candidates based on the respective aggregation level and a respective total quantity of CCEs for the search space set. For instance, UE 115-*c* may determine the respective second quantity based on dividing the respective total quantity of CCEs by the respective aggregation level. Additionally or alternatively, UE 115-*c* may determine the respective second quantity based on a minimum between the respective total quantity of CCEs divided by the respective aggregation level and a respective total quantity of downlink control channel candidates configured for the search space set. In some examples, the configuration may include a set of CORESETs. In such examples, the first downlink control candidate and the second downlink control channel candidate may each be associated with a first CORESET of the set of CORESETs. In some examples, the first downlink control channel candidate may be associated with a first search space set of the set of search space sets and the second downlink control channel candidate may be associated with a second search space set of the set of search space sets. In other examples, the first downlink control channel candidate and the second downlink control channel candidate may be each associated with a first search space set of the set of search space sets.

At 415, UE 115-*c* may exclude one or more of the set of search space sets from a subset of the set of search space sets based on the quantity of downlink control channel candidates satisfying a threshold. Additionally, UE 115-*c* may monitor the downlink control channel according to the subset of the set of search space sets. In some examples, each of the excluded one or more search space sets may be UE-specific. Additionally or alternatively, the subset of the set of search space sets may include one or more additional UE-specific search space sets distinct from the excluded one or more search space sets and one or more second search space sets common to multiple UEs (e.g., including UE 115-*c*).

At 420, base station 105-*c* may transmit a downlink control channel transmission to UE 115-*c*. UE 115-*c* may receive the downlink control transmission over at least one of the subset of the set of search space sets.

Figure 5:
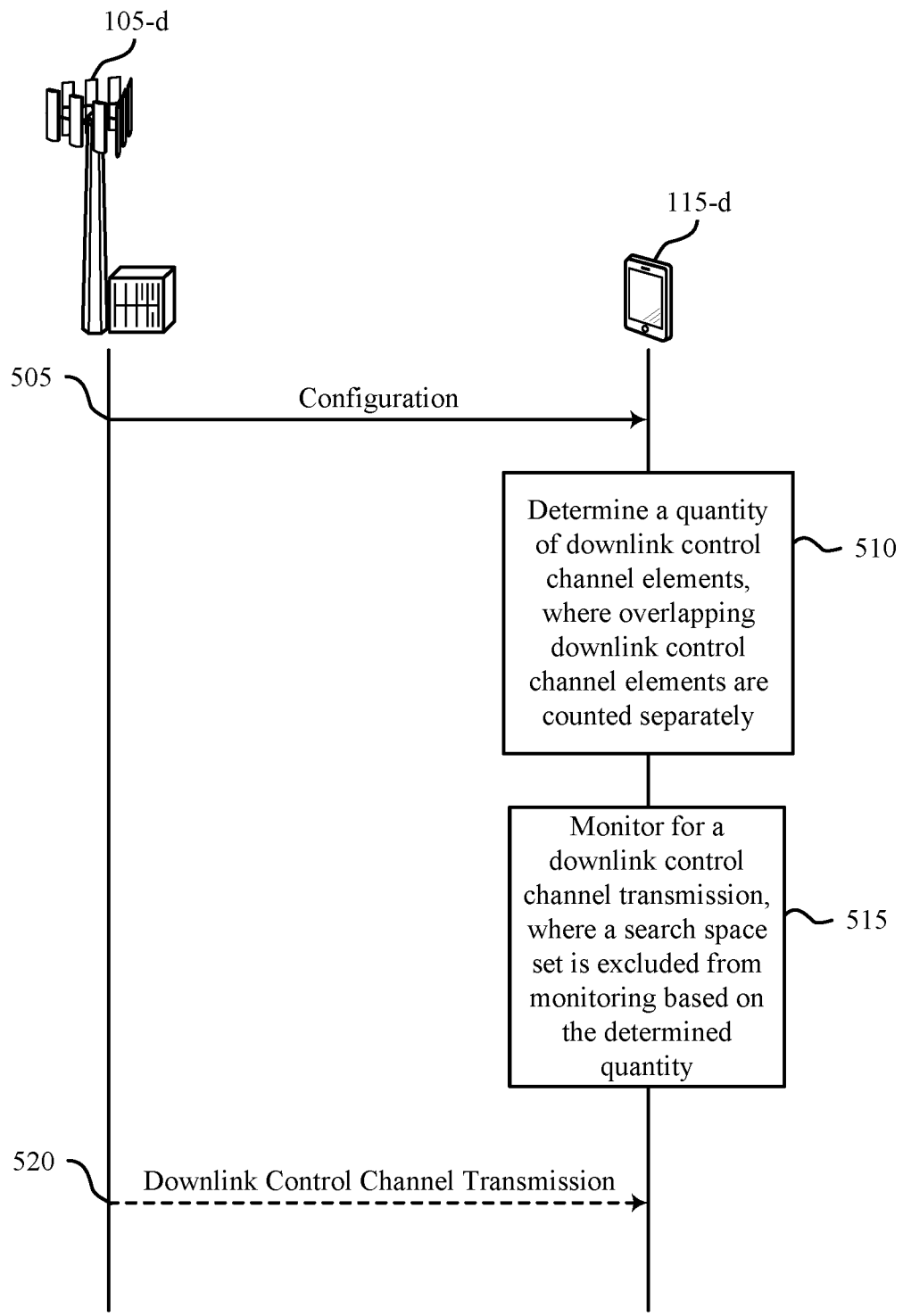
FIG. 5 illustrates an example of a process flow that supports methods for reducing complexity with counting control channel candidates and control channel elements in accordance with aspects of the present disclosure.

FIG. 5 illustrates an example of a process flow 500 that supports methods for reducing complexity with counting control channel candidates and control channel elements in accordance with aspects of the present disclosure. In some examples, FIG. 5 may be implemented by one or more aspects of wireless communications systems 100, 200, or 300. For instance, base station 105-*d* may be an example of a base station 105 as described with reference to FIG. 1, a base station 105-*a* as described with reference to FIG. 2, a base station 105-*b* as described with reference to FIG. 3, or any combination thereof. Similarly, UE 115-*d* may be an example of a UE 115 as described with reference to FIG. 1, a UE 115-*a* as described with reference to FIG. 2, a UE 115-*b* as described with reference to FIG. 3, or any combination thereof.

In some examples, CCEs in different CORESETs may be counted as separate CCEs, but CCEs across search space sets within the CORESET may be counted as a same CCE. In some such examples, UE 115-*d* may check an overlapping condition across search space sets. However, by checking the overlapping condition, UE 115-*d* may count CCEs with a greater latency than if refraining from checking the overlapping condition. For instance, if UE 115-*d* determines that CCEs in different search space sets associated with the same CORESET are counted as separate CCEs, UE 115-*c* may refrain from checking the overlapping condition (e.g., determining the CCE allocation function and the hashing function Y as described in FIG. 2) when counting the CCEs. In some examples, overlapped CCEs (e.g., in time, in frequency, or both) associated with different search space sets with the same PDCCH starting symbol and associated with the same CORESET may be counted separately. Additionally or alternatively, overlapped CCEs associated with a same search space set with the same PDCCH starting symbol and associated with the same CORESET may be counted separately.

At 505, base station 105-d may transmit, to UE 115-d, a configuration of a set of search space sets for a downlink control channel.

At 515, UE 115-d may exclude one or more of the set of search space sets from a subset of the set of search space sets based on the quantity of downlink control channel candidates satisfying a threshold. Additionally, UE 115-d may monitor the downlink control channel according to the subset of the set of search space sets. In some examples, each of the excluded one or more search space sets may be UE-specific. Additionally or alternatively, the subset of the set of search space sets may include one or more additional UE-specific search space sets distinct from the excluded one or more search space sets and one or more second search space sets common to multiple UEs (e.g., including UE 115-d).

At 520, base station 105-d may transmit a downlink control channel transmission to UE 115-d. UE 115-c may receive the downlink control transmission over at least one of the subset of the set of search space sets.

Figure 6:
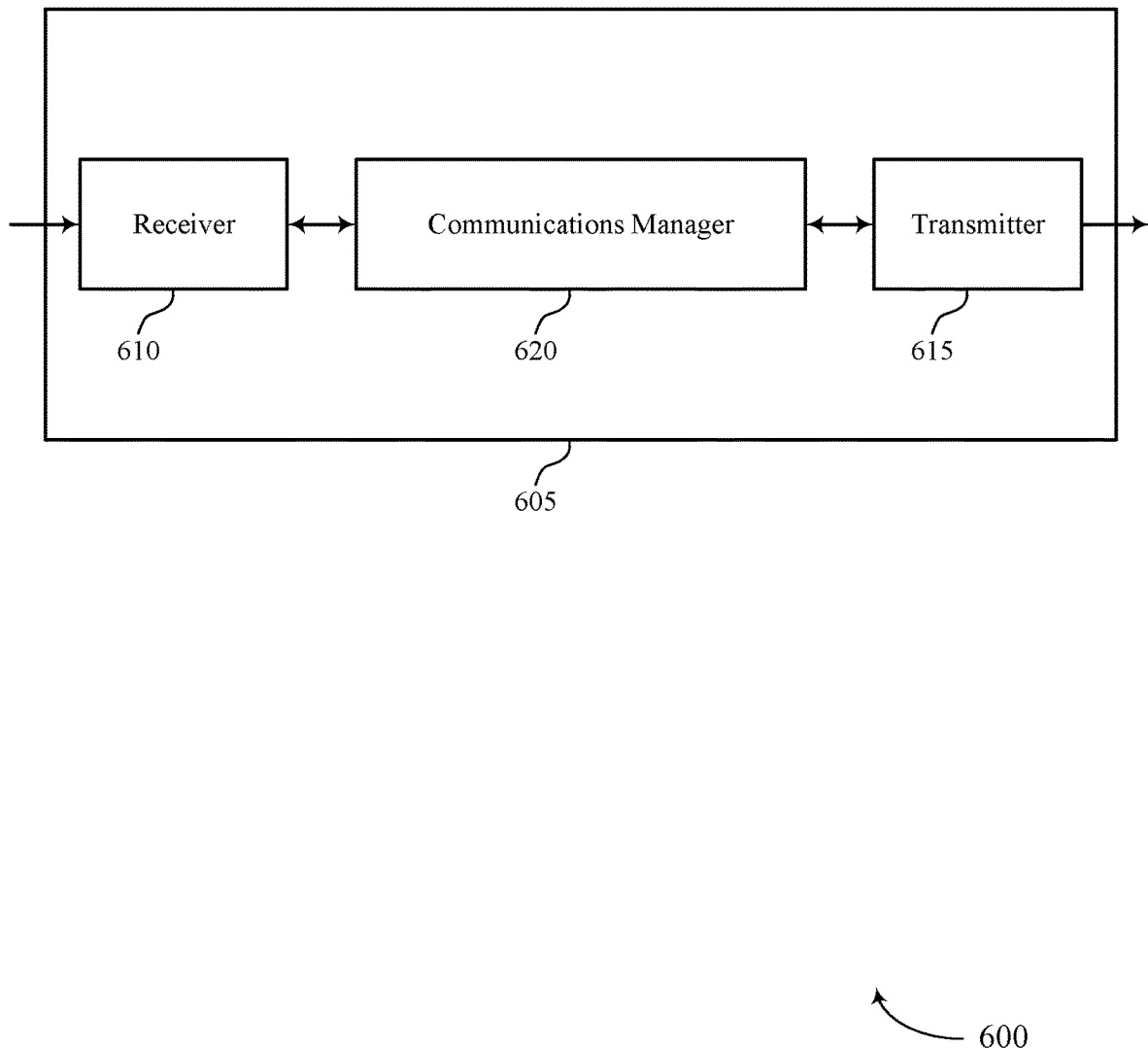
FIGS. 6 and 7 show block diagrams of devices that support methods for reducing complexity with counting control channel candidates and control channel elements in accordance with aspects of the present disclosure.

FIG. 6 shows a block diagram 600 of a device 605 that supports methods for reducing complexity with counting control channel candidates and control channel elements in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to methods for reducing complexity with counting control channel candidates and control channel elements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods for reducing complexity with counting control channel candidates and control channel elements). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of methods for reducing complexity with counting control channel candidates and control channel elements as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

Additionally or alternatively, the communications manager 620 may support wireless communication at a UE in accordance with examples as disclosed herein. For example, the communications manager 620 may be configured as or otherwise support a means for receiving a configuration of a set of multiple search space sets for a downlink control channel. The communications manager 620 may be configured as or otherwise support a means for determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates. The communications manager 620 may be configured as or otherwise support a means for monitoring the downlink control channel according to a subset of the set of multiple search space sets, where the subset of the set of multiple search space sets excludes one or more of the set of multiple search space sets based on the quantity of downlink control channel candidates satisfying a threshold.

Additionally or alternatively, the communications manager 620 may support wireless communication at a UE in accordance with examples as disclosed herein. For example, the communications manager 620 may be configured as or otherwise support a means for receiving a configuration of a set of multiple search space sets for a downlink control channel. The communications manager 620 may be configured as or otherwise support a means for determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements. The communications manager 620 may be configured as or otherwise support a means for monitoring the downlink control channel according to a subset of the set of multiple search space sets, where the subset of the set of multiple search space sets excludes one or more of the set of multiple search space sets based on the quantity of downlink control channel elements satisfying a threshold.

For example, the communications manager 620 may be configured as or otherwise support a means for receiving a configuration of a set of multiple search space sets for a downlink control channel. The communications manager 620 may be configured as or otherwise support a means for determining a quantity of downlink control channel units for monitoring over the set of multiple search space sets, where a first downlink control channel unit and a second downlink control channel unit that overlaps with the first downlink control channel unit are each counted separately in the quantity of downlink control channel units. The communications manager 620 may be configured as or otherwise support a means for monitoring the downlink control channel according to a subset of the set of multiple search space sets, where the subset of the set of multiple search space sets excludes one or more of the set of multiple search space sets based on the quantity of control channel units satisfying a threshold.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for the device 605 to decrease a latency associated with checking whether CCEs and/or PDCCH candidates exceed a threshold by decreasing a complexity associated with the checking.

Figure 7:
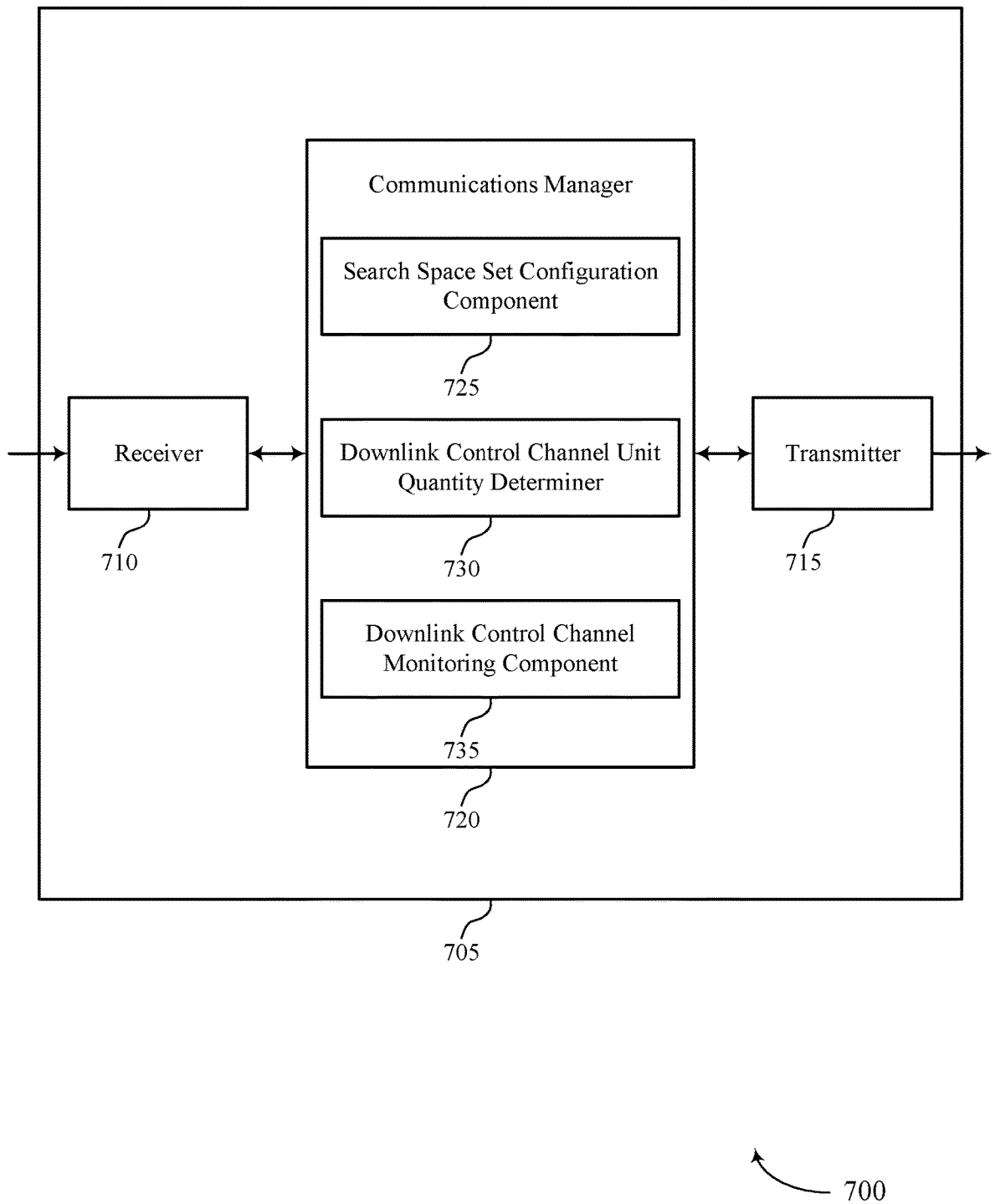

FIG. 7 shows a block diagram 700 of a device 705 that supports methods for reducing complexity with counting control channel candidates and control channel elements in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to methods for reducing complexity with counting control channel candidates and control channel elements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to methods for reducing complexity with counting control channel candidates and control channel elements). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of methods for reducing complexity with counting control channel candidates and control channel elements as described herein. For example, the communications manager 720 may include a search space set configuration component 725, a downlink control channel unit quantity determiner 730, a downlink control channel monitoring component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The search space set configuration component 725 may be configured as or otherwise support a means for receiving a configuration of a set of multiple search space sets for a downlink control channel. The downlink control channel unit quantity determiner 730 may be configured as or otherwise support a means for determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates. The downlink control channel monitoring component 735 may be configured as or otherwise support a means for monitoring the downlink control channel according to a subset of the set of multiple search space sets, where the subset of the set of multiple search space sets excludes one or more of the set of multiple search space sets based on the quantity of downlink control channel candidates satisfying a threshold.

Additionally or alternatively, the communications manager 720 may support wireless communication at a UE in accordance with examples as disclosed herein. The search space set configuration component 725 may be configured as or otherwise support a means for receiving a configuration of a set of multiple search space sets for a downlink control channel. The downlink control channel unit quantity determiner 730 may be configured as or otherwise support a means for determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements. The downlink control channel monitoring component 735 may be configured as or otherwise support a means for monitoring the downlink control channel according to a subset of the set of multiple search space sets, where the subset of the set of multiple search space sets excludes one or more of the set of multiple search space sets based on the quantity of downlink control channel elements satisfying a threshold.

The search space set configuration component 725 may be configured as or otherwise support a means for receiving a configuration of a set of multiple search space sets for a downlink control channel. The downlink control channel unit quantity determiner 730 may be configured as or otherwise support a means for determining a quantity of downlink control channel units for monitoring over the set of multiple search space sets, where a first downlink control channel unit and a second downlink control channel unit that overlaps with the first downlink control channel unit are each counted separately in the quantity of downlink control channel units. The downlink control channel monitoring component 735 may be configured as or otherwise support a means for monitoring the downlink control channel according to a subset of the set of multiple search space sets, where the subset of the set of multiple search space sets excludes one or more of the set of multiple search space sets based on the quantity of control channel units satisfying a threshold.

Figure 8:
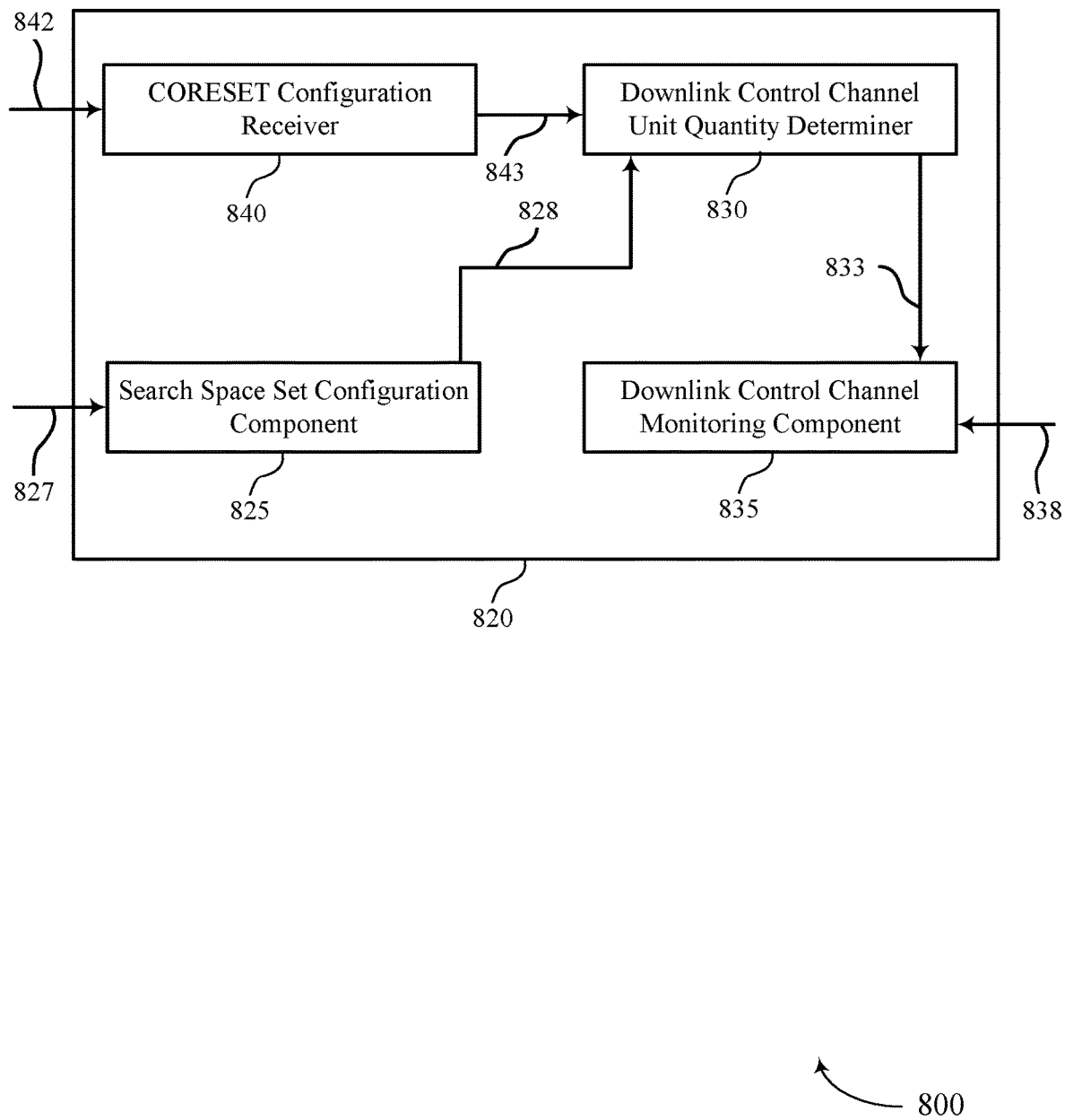
FIG. 8 shows a block diagram of a communications manager that supports methods for reducing complexity with counting control channel candidates and control channel elements in accordance with aspects of the present disclosure.

FIG. 8 shows a block diagram 800 of a communications manager 820 that supports methods for reducing complexity with counting control channel candidates and control channel elements in accordance with aspects of the present disclosure. The communications manager 820 may be an example of aspects of a communications manager 620, a communications manager 720, or both, as described herein. The communications manager 820, or various components thereof, may be an example of means for performing various aspects of methods for reducing complexity with counting control channel candidates and control channel elements as described herein. For example, the communications manager 820 may include a search space set configuration component 825, a downlink control channel unit quantity determiner 830, a downlink control channel monitoring component 835, a CORESET configuration receiver 840, or any combination thereof. Each of these components may communicate, directly or indirectly, with one another (e.g., via one or more buses).

Additionally or alternatively, the communications manager 820 may support wireless communication at a UE in accordance with examples as disclosed herein. The search space set configuration component 825 may be configured as or otherwise support a means for receiving a configuration of a set of multiple search space sets for a downlink control channel. For instance, the search space set configuration component 825 may receive an indication 827 of the configuration. The downlink control channel unit quantity determiner 830 may be configured as or otherwise support a means for determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates. In some examples, search space set configuration component 825 may transmit an indication 828 of the configuration to downlink control channel unit quantity determiner 830. The downlink control channel monitoring component 835 may be configured as or otherwise support a means for monitoring the downlink control channel according to a subset of the set of multiple search space sets, where the subset of the set of multiple search space sets excludes one or more of the set of multiple search space sets based on the quantity of downlink control channel candidates satisfying a threshold. In some examples, downlink control channel unit quantity determiner 830 may transmit an indication 833 of the quantity of downlink control channel candidates to downlink control channel monitoring component 835. In some examples, downlink control channel monitoring component 835 may receive a downlink control channel transmission 838 based on the monitoring.

In some examples, the configuration includes a set of multiple control resource sets. In some examples, the first downlink control channel candidate and the second downlink control channel candidate are each associated with a first control resource set of the set of multiple control resource sets.

In some examples, to support determining the quantity of downlink control channel candidates, the downlink control channel unit quantity determiner 830 may be configured as or otherwise support a means for determining the quantity of downlink control channel candidates based on a respective aggregation level for each search space set of the set of multiple search space sets.

In some examples, to support determining the quantity of downlink control channel candidates, the downlink control channel unit quantity determiner 830 may be configured as or otherwise support a means for determining, for each search space set of the set of multiple search space sets, a respective second quantity of downlink control channel candidates based on the respective aggregation level and a respective total quantity of control channel elements for the search space set. In some examples, to support determining the quantity of downlink control channel candidates, the downlink control channel unit quantity determiner 830 may be configured as or otherwise support a means for aggregating the respective second quantity of downlink control channel candidates for each search space set of the set of multiple search space sets to calculate the quantity of downlink control channel candidates.

In some examples, the respective second quantity of downlink control channel candidates for each search space set of the set of multiple search space sets is determined based on dividing the respective total quantity of control channel elements by the respective aggregation level.

In some examples, the respective second quantity of downlink control channel candidates is based on a minimum between the respective total quantity of control channel elements divided by the respective aggregation level and a respective total quantity of downlink control channel candidates configured for the search space set.

In some examples, the first downlink control channel candidate is associated with a first search space set of the set of multiple search space sets and the second downlink control channel candidate is associated with a second search space set of the set of multiple search space sets.

In some examples, the first downlink control channel candidate and the second downlink control channel candidate are each associated with a first search space set of the set of multiple search space sets.

In some examples, each of the excluded one or more search space sets are UE-specific.

In some examples, the subset of the set of multiple search space sets includes one or more additional UE-specific search space sets distinct from the excluded one or more search space sets and one or more second search space sets common to multiple UEs.

Additionally or alternatively, the communications manager 820 may support wireless communication at a UE in accordance with examples as disclosed herein. In some examples, the search space set configuration component 825 may be configured as or otherwise support a means for receiving a configuration of a set of multiple search space sets for a downlink control channel. For instance, search space set configuration component 825 may be configured to receive an indication 827 of the configuration. In some examples, the downlink control channel unit quantity determiner 830 may be configured as or otherwise support a means for determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements. In some examples, search space set configuration component 825 may transmit an indication 828 of the configuration to downlink control channel unit quantity determiner 830. In some examples, the downlink control channel monitoring component 835 may be configured as or otherwise support a means for monitoring the downlink control channel according to a subset of the set of multiple search space sets, where the subset of the set of multiple search space sets excludes one or more of the set of multiple search space sets based on the quantity of downlink control channel elements satisfying a threshold. In some examples, downlink control channel unit quantity determiner 830 may be configured to transmit an indication 833 of the quantity of downlink control channel elements to downlink control channel monitoring component 835. In some examples, downlink control channel monitoring component 835 may be configured to receive a downlink control channel transmission 838.

In some examples, the first downlink control channel element and the second downlink control channel element are each associated with a first search space set of the set of multiple search space sets.

In some examples, the CORESET configuration receiver 840 may be configured as or otherwise support a means for receiving a second configuration of a set of multiple control resource sets for the downlink control channel, where the first downlink control channel element is associated with a first search space set of the set of multiple search space sets and a first control resource set of the set of multiple control resource sets, and where the second downlink control channel element is associated with a second search space set of the set of multiple search space sets and the first control resource set. For instance, the CORESET configuration receiver 840 may be configured to receive an indication 842 of the second configuration. In some examples, CORESET configuration receiver 840 may be configured to transmit an indication 843 of the second configuration to downlink control channel unit quantity determiner 830.

In some examples, the first downlink control channel element and the second downlink control channel element are associated with a same downlink control channel starting symbol.

In some examples, each of the excluded one or more search space sets are UE-specific.

In some examples, the search space set configuration component 825 may be configured as or otherwise support a means for receiving a configuration of a set of multiple search space sets for a downlink control channel. For instance, search space set configuration component 825 may receive an indication 827 of the configuration. In some examples, the downlink control channel unit quantity determiner 830 may be configured as or otherwise support a means for determining a quantity of downlink control channel units for monitoring over the set of multiple search space sets, where a first downlink control channel unit and a second downlink control channel unit that overlaps with the first downlink control channel unit are each counted separately in the quantity of downlink control channel units. In some examples, search space set configuration component 825 may transmit an indication 828 of the configuration to downlink control channel unit quantity determiner 830. In some examples, the downlink control channel monitoring component 835 may be configured as or otherwise support a means for monitoring the downlink control channel according to a subset of the set of multiple search space sets, where the subset of the set of multiple search space sets excludes one or more of the set of multiple search space sets based on the quantity of control channel units satisfying a threshold. In some examples, downlink control channel unit quantity determiner 830 may be configured to transmit an indication 833 of the quantity of downlink control channel units to downlink control channel monitoring component 835. In some examples, downlink control channel monitoring component 835 may be configured to receive a downlink control channel transmission 838.

Figure 9:
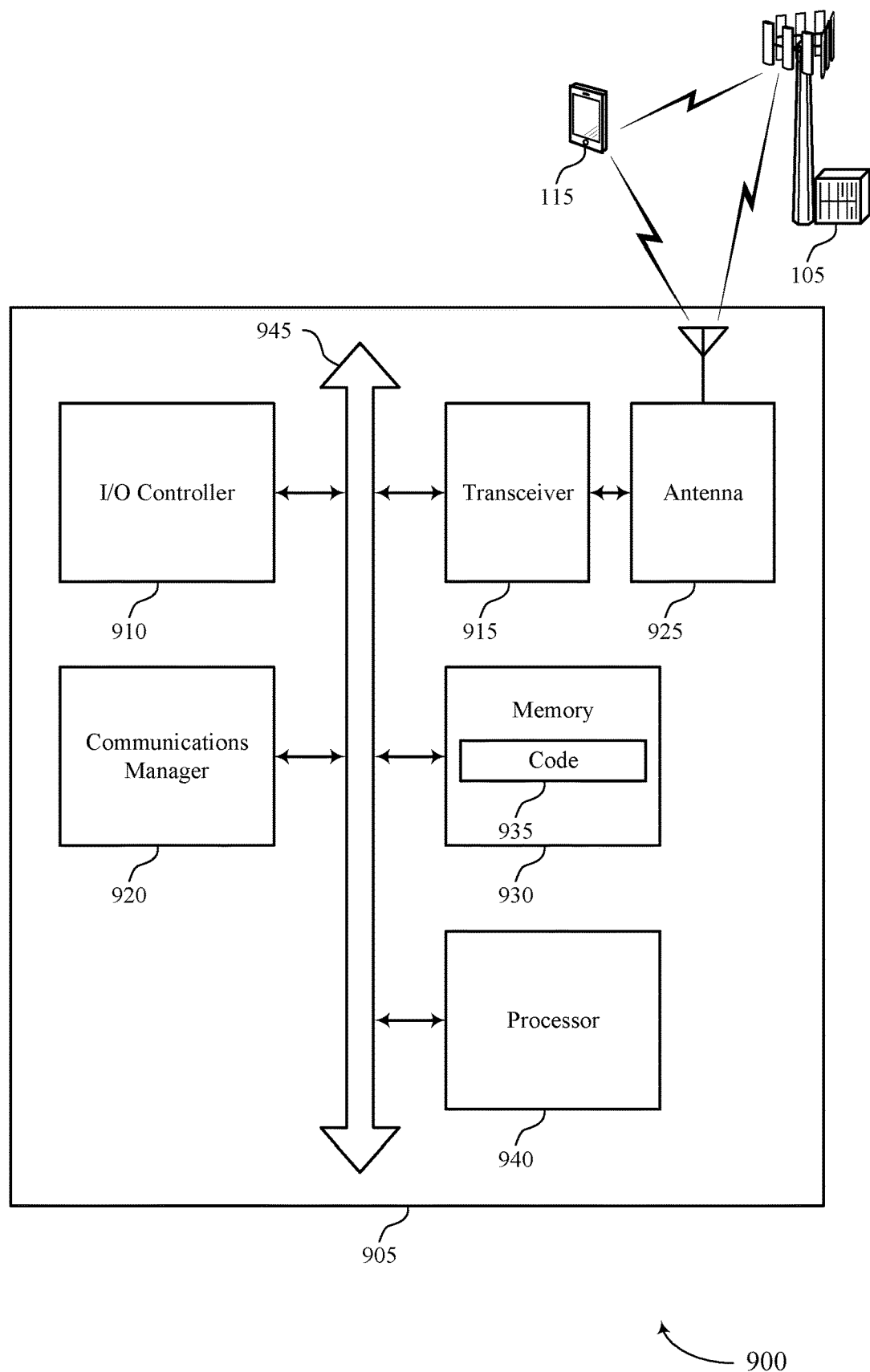
FIG. 9 shows a diagram of a system including a device that supports methods for reducing complexity with counting control channel candidates and control channel elements in accordance with aspects of the present disclosure.

FIG. 9 shows a diagram of a system 900 including a device 905 that supports methods for reducing complexity with counting control channel candidates and control channel elements in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting methods for reducing complexity with counting control channel candidates and control channel elements). For example, the device 905 or a component of the device 905 may include a processor 940 and memory 930 coupled with or to the processor 940, the processor 940 and memory 930 configured to perform various functions described herein.

Additionally or alternatively, the communications manager 920 may support wireless communication at a UE in accordance with examples as disclosed herein. For example, the communications manager 920 may be configured as or otherwise support a means for receiving a configuration of a set of multiple search space sets for a downlink control channel. The communications manager 920 may be configured as or otherwise support a means for determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates. The communications manager 920 may be configured as or otherwise support a means for monitoring the downlink control channel according to a subset of the set of multiple search space sets, where the subset of the set of multiple search space sets excludes one or more of the set of multiple search space sets based on the quantity of downlink control channel candidates satisfying a threshold.

Additionally or alternatively, the communications manager 920 may support wireless communication at a UE in accordance with examples as disclosed herein. For example, the communications manager 920 may be configured as or otherwise support a means for receiving a configuration of a set of multiple search space sets for a downlink control channel. The communications manager 920 may be configured as or otherwise support a means for determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements. The communications manager 920 may be configured as or otherwise support a means for monitoring the downlink control channel according to a subset of the set of multiple search space sets, where the subset of the set of multiple search space sets excludes one or more of the set of multiple search space sets based on the quantity of downlink control channel elements satisfying a threshold.

For example, the communications manager 920 may be configured as or otherwise support a means for receiving a configuration of a set of multiple search space sets for a downlink control channel. The communications manager 920 may be configured as or otherwise support a means for determining a quantity of downlink control channel units for monitoring over the set of multiple search space sets, where a first downlink control channel unit and a second downlink control channel unit that overlaps with the first downlink control channel unit are each counted separately in the quantity of downlink control channel units. The communications manager 920 may be configured as or otherwise support a means for monitoring the downlink control channel according to a subset of the set of multiple search space sets, where the subset of the set of multiple search space sets excludes one or more of the set of multiple search space sets based on the quantity of control channel units satisfying a threshold.

By including or configuring the communications manager 920 in accordance with examples as described herein, the device 905 may support techniques for device 905 to decrease a latency associated with checking whether CCEs and/or PDCCH candidates exceed a threshold by decreasing a complexity associated with the checking.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of methods for reducing complexity with counting control channel candidates and control channel elements as described herein, or the processor 940 and the memory 930 may be otherwise configured to perform or support such operations.

Figure 10:
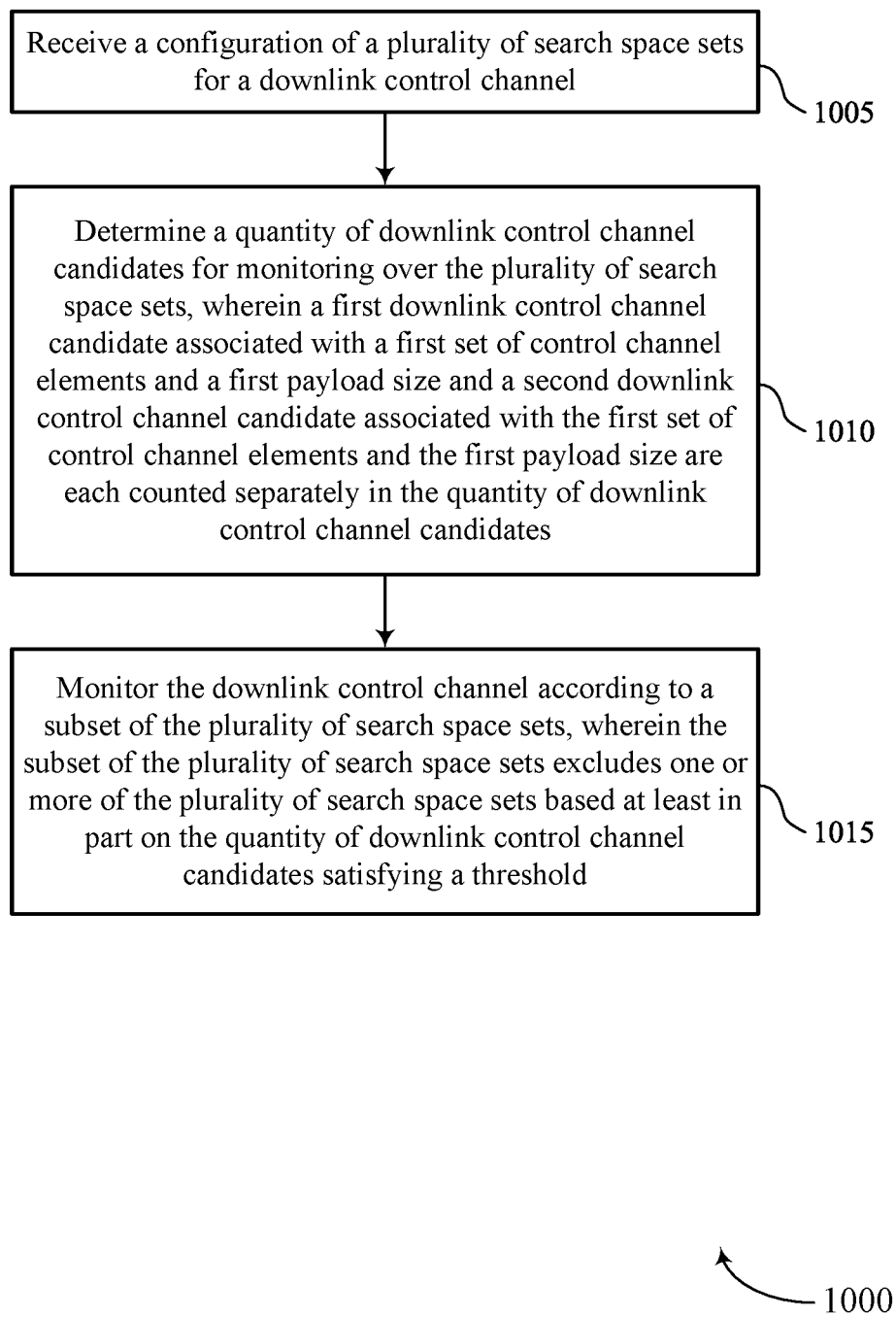
FIGS. 10 through 12 show flowcharts illustrating methods that support methods for reducing complexity with counting control channel candidates and control channel elements in accordance with aspects of the present disclosure.

FIG. 10 shows a flowchart illustrating a method 1000 that supports methods for reducing complexity with counting control channel candidates and control channel elements in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving a configuration of a set of multiple search space sets for a downlink control channel. In some examples, receiving the configuration of the set of multiple search space sets may include identifying time-frequency resources for receiving the configuration and receiving the configuration over the time-frequency resources. The operations of 1005 may be performed in accordance with examples as disclosed herein. In some examples, aspects of the operations of 1005 may be performed by a search space set configuration component 825 as described with reference to FIG. 8.

At 1010, the method may include determining a quantity of downlink control channel candidates for monitoring over the set of multiple search space sets, where a first downlink control channel candidate associated with a first set of control channel elements and a first payload size and a second downlink control channel candidate associated with the first set of control channel elements and the first payload size are each counted separately in the quantity of downlink control channel candidates. In some examples, determining the quantity of downlink control channel candidates may include identifying a set of downlink control channel candidates and counting each downlink control channel candidate in the set. The operations of 1010 may be performed in accordance with examples as disclosed herein. In some examples, aspects of the operations of 1010 may be performed by a downlink control channel unit quantity determiner 830 as described with reference to FIG. 8.

At 1015, the method may include monitoring the downlink control channel according to a subset of the set of multiple search space sets, where the subset of the set of multiple search space sets excludes one or more of the set of multiple search space sets based on the quantity of downlink control channel candidates satisfying a threshold. In some examples, monitoring the downlink control channel according to the subset may include dropping the one or more search space sets from the set of multiple search space sets and measuring the downlink control channel over the subset. The operations of 1015 may be performed in accordance with examples as disclosed herein. In some examples, aspects of the operations of 1015 may be performed by a downlink control channel monitoring component 835 as described with reference to FIG. 8.

Figure 11:
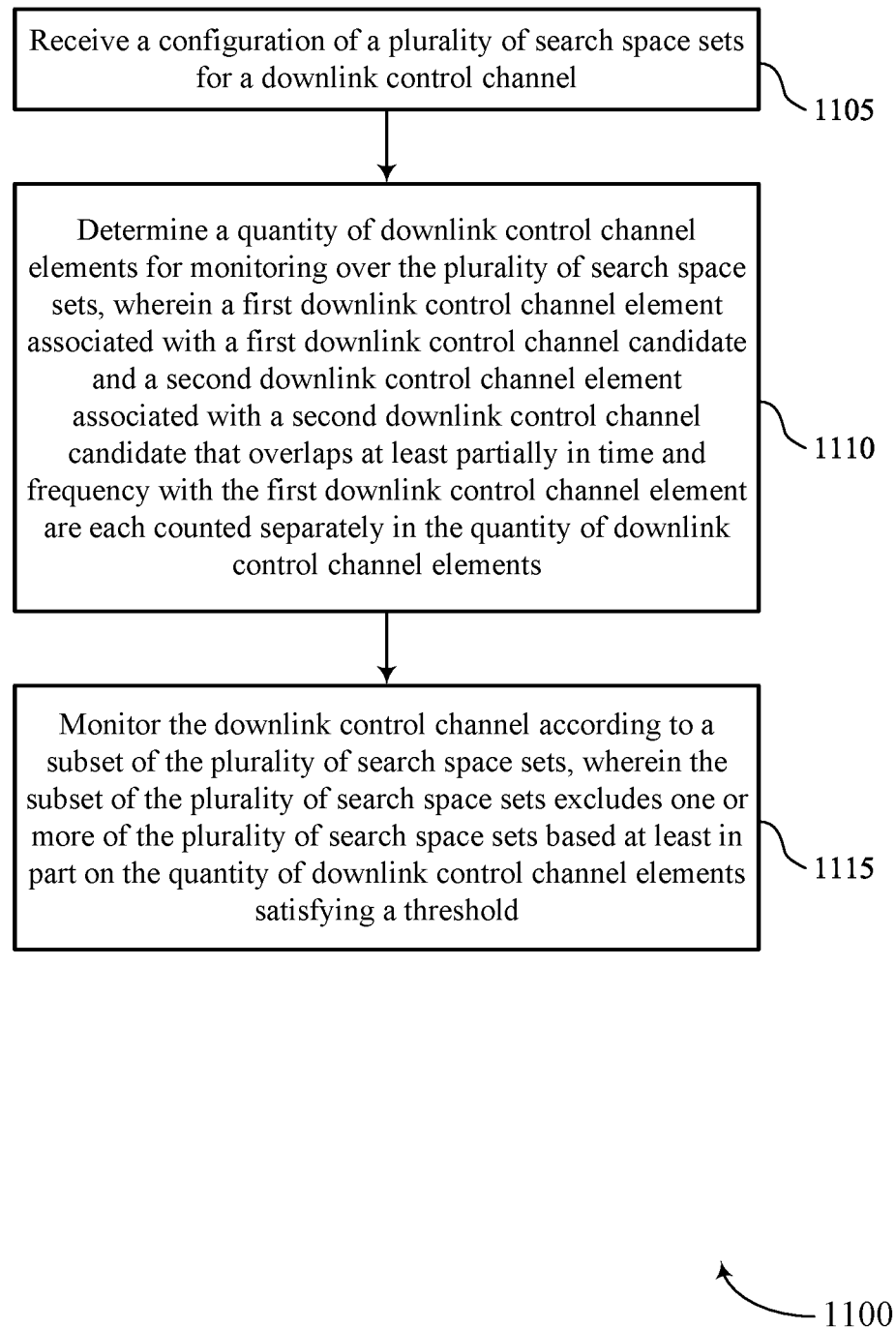

FIG. 11 shows a flowchart illustrating a method 1100 that supports methods for reducing complexity with counting control channel candidates and control channel elements in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving a configuration of a set of multiple search space sets for a downlink control channel. The operations of 1105 may be performed in accordance with examples as disclosed herein. In some examples, receiving the configuration of the set of multiple search space sets may include identifying time-frequency resources for receiving the configuration and receiving the configuration over the time-frequency resources. In some examples, aspects of the operations of 1105 may be performed by a search space set configuration component 825 as described with reference to FIG. 8.

At 1110, the method may include determining a quantity of downlink control channel elements for monitoring over the set of multiple search space sets, where a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements. In some examples, determining the quantity of downlink control channel elements may include identifying a set of downlink control channel elements and counting each downlink control channel element in the set. The operations of 1110 may be performed in accordance with examples as disclosed herein. In some examples, aspects of the operations of 1110 may be performed by a downlink control channel unit quantity determiner 830 as described with reference to FIG. 8.

At 1115, the method may include monitoring the downlink control channel according to a subset of the set of multiple search space sets, where the subset of the set of multiple search space sets excludes one or more of the set of multiple search space sets based on the quantity of downlink control channel elements satisfying a threshold. In some examples, monitoring the downlink control channel according to the subset may include dropping the one or more search space sets from the set of multiple search space sets and measuring the downlink control channel over the subset. The operations of 1115 may be performed in accordance with examples as disclosed herein. In some examples, aspects of the operations of 1115 may be performed by a downlink control channel monitoring component 835 as described with reference to FIG. 8.

Figure 12:
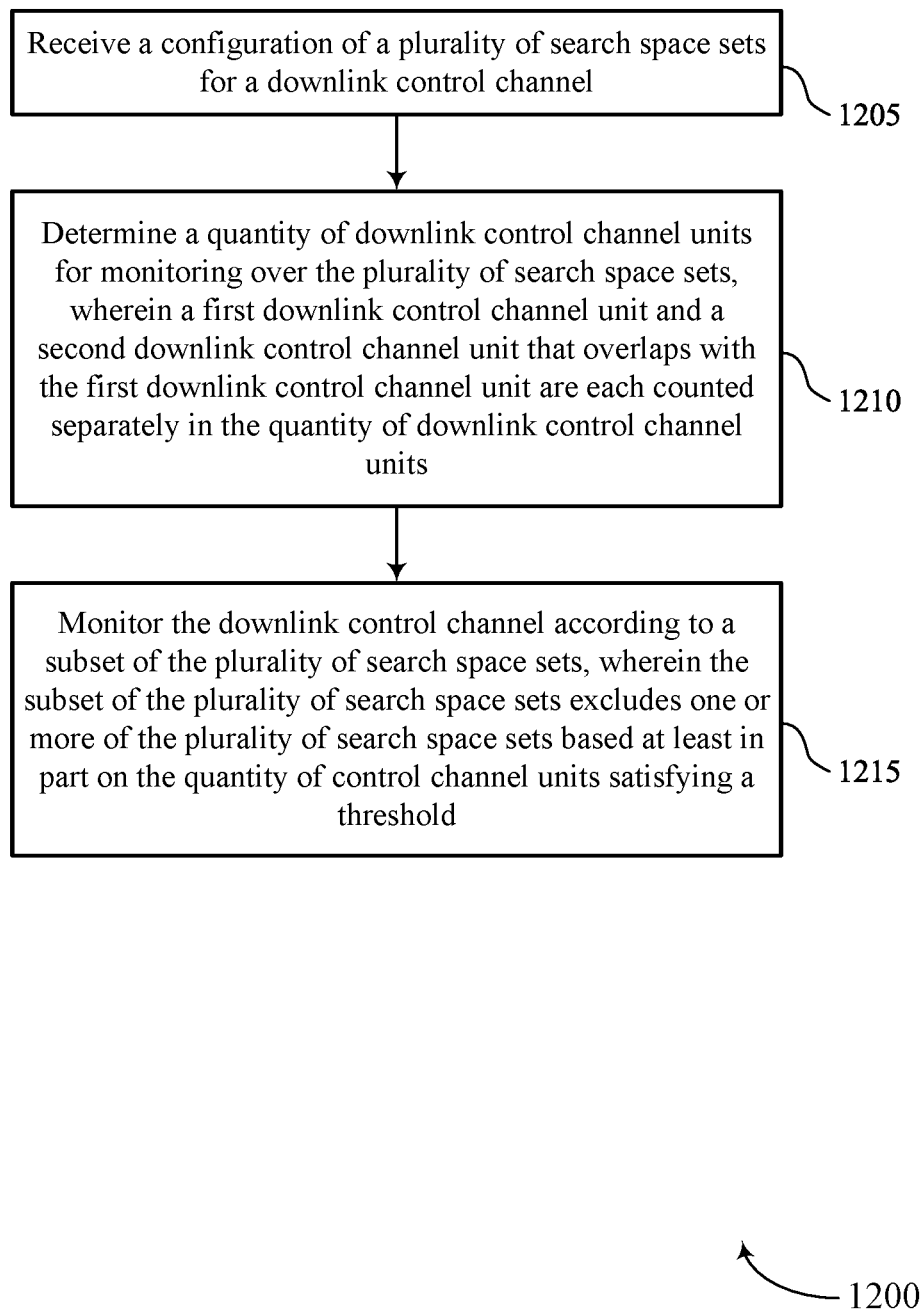

FIG. 12 shows a flowchart illustrating a method 1200 that supports methods for reducing complexity with counting control channel candidates and control channel elements in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving a configuration of a set of multiple search space sets for a downlink control channel. In some examples, receiving the configuration of the set of multiple search space sets may include identifying time-frequency resources for receiving the configuration and receiving the configuration over the time-frequency resources. The operations of 1205 may be performed in accordance with examples as disclosed herein. In some examples, aspects of the operations of 1205 may be performed by a search space set configuration component 825 as described with reference to FIG. 8.

At 1210, the method may include determining a quantity of downlink control channel units for monitoring over the set of multiple search space sets, where a first downlink control channel unit and a second downlink control channel unit that overlaps with the first downlink control channel unit are each counted separately in the quantity of downlink control channel units. In some examples, determining the quantity of downlink control channel units may include identifying a set of downlink control channel units and counting each downlink control channel unit in the set. The operations of 1210 may be performed in accordance with examples as disclosed herein. In some examples, aspects of the operations of 1210 may be performed by a downlink control channel unit quantity determiner 830 as described with reference to FIG. 8.

At 1215, the method may include monitoring the downlink control channel according to a subset of the set of multiple search space sets, where the subset of the set of multiple search space sets excludes one or more of the set of multiple search space sets based on the quantity of control channel units satisfying a threshold. In some examples, monitoring the downlink control channel according to the subset may include dropping the one or more search space sets from the set of multiple search space sets and measuring the downlink control channel over the subset. The operations of 1215 may be performed in accordance with examples as disclosed herein. In some examples, aspects of the operations of 1215 may be performed by a downlink control channel monitoring component 835 as described with reference to FIG. 8.

The following provides an overview of aspects of the present disclosure:

Aspect 1: A method for wireless communication at a UE, comprising: receiving a configuration of a plurality of search space sets for a downlink control channel; determining a quantity of downlink control channel candidates for monitoring over the plurality of search space sets, wherein a first downlink control channel candidate associated with a first set of control channel elements and a first payload size and a second downlink control channel candidate associated with the first set of control channel elements and the first payload size are each counted separately in the quantity of downlink control channel candidates; and monitoring the downlink control channel according to a subset of the plurality of search space sets, wherein the subset of the plurality of search space sets excludes one or more of the plurality of search space sets based at least in part on the quantity of downlink control channel candidates satisfying a threshold.

Aspect 2: The method of aspect 1, wherein. the configuration comprises a plurality of control resource sets, and the first downlink control channel candidate and the second downlink control channel candidate are each associated with a first control resource set of the plurality of control resource sets Aspect 3: The method of any of aspects 1 through 2, wherein determining the quantity of downlink control channel candidates comprises: determining the quantity of downlink control channel candidates based at least in part on a respective aggregation level for each search space set of the plurality of search space sets.

Aspect 4: The method of aspect 3, wherein determining the quantity of downlink control channel candidates comprises: determining, for each search space set of the plurality of search space sets, a respective second quantity of downlink control channel candidates based at least in part on the respective aggregation level and a respective total quantity of control channel elements for the search space set; and aggregating the respective second quantity of downlink control channel candidates for each search space set of the plurality of search space sets to calculate the quantity of downlink control channel candidates.

Aspect 5: The method of aspect 4, wherein the respective second quantity of downlink control channel candidates for each search space set of the plurality of search space sets is determined based at least in part on dividing the respective total quantity of control channel elements by the respective aggregation level.

Aspect 6: The method of any of aspects 4 through 5, wherein the respective second quantity of downlink control channel candidates is based at least in part on a minimum between the respective total quantity of control channel elements divided by the respective aggregation level and a respective total quantity of downlink control channel candidates configured for the search space set.

Aspect 7: The method of any of aspects 1 through 6, wherein the first downlink control channel candidate is associated with a first search space set of the plurality of search space sets and the second downlink control channel candidate is associated with a second search space set of the plurality of search space sets.

Aspect 8: The method of any of aspects 1 through 7, wherein the first downlink control channel candidate and the second downlink control channel candidate are each associated with a first search space set of the plurality of search space sets.

Aspect 9: The method of any of aspects 1 through 8, wherein each of the excluded one or more search space sets are UE-specific.

Aspect 10: The method of aspect 9, wherein the subset of the plurality of search space sets includes one or more additional UE-specific search space sets distinct from the excluded one or more search space sets and one or more second search space sets common to multiple UEs.

Aspect 11: A method for wireless communication at a UE, comprising: receiving a configuration of a plurality of search space sets for a downlink control channel; determining a quantity of downlink control channel elements for monitoring over the plurality of search space sets, wherein a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements; monitoring the downlink control channel according to a subset of the plurality of search space sets, wherein the subset of the plurality of search space sets excludes one or more of the plurality of search space sets based at least in part on the quantity of downlink control channel elements satisfying a threshold.

Aspect 12: The method of aspect 11, wherein the first downlink control channel element and the second downlink control channel element are each associated with a first search space set of the plurality of search space sets.

Aspect 13: The method of any of aspects 11 through 12, further comprising: receiving a second configuration of a plurality of control resource sets for the downlink control channel, wherein the first downlink control channel element is associated with a first search space set of the plurality of search space sets and a first control resource set of the plurality of control resource sets, and wherein the second downlink control channel element is associated with a second search space set of the plurality of search space sets and the first control resource set.

Aspect 14: The method of any of aspects 11 through 13, wherein the first downlink control channel element and the second downlink control channel element are associated with a same downlink control channel starting symbol.

Aspect 15: The method of any of aspects 11 through 14, wherein each of the excluded one or more search space sets are UE-specific.

Aspect 16: An apparatus for wireless communication at a UE, comprising a processor; memory coupled with the processor; and instructions stored in the memory and executable by the processor to cause the apparatus to perform a method of any of aspects 1 through 10.

Aspect 17: An apparatus for wireless communication at a UE, comprising at least one means for performing a method of any of aspects 1 through 10.

Aspect 18: A non-transitory computer-readable medium storing code for wireless communication at a UE, the code comprising instructions executable by a processor to perform a method of any of aspects 1 through 10.

Aspect 19: An apparatus for wireless communication at a UE, comprising a processor; memory coupled with the processor; and instructions stored in the memory and executable by the processor to cause the apparatus to perform a method of any of aspects 11 through 15.

Aspect 20: An apparatus for wireless communication at a UE, comprising at least one means for performing a method of any of aspects 11 through 15.

Aspect 21: A non-transitory computer-readable medium storing code for wireless communication at a UE, the code comprising instructions executable by a processor to perform a method of any of aspects 11 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive a configuration of a plurality of search space sets for a downlink control channel;
      determine a quantity of downlink control channel candidates for monitoring over the plurality of search space sets, wherein a first downlink control channel candidate associated with a first set of control channel elements and a first payload size and a second downlink control channel candidate associated with the first set of control channel elements and the first payload size are each counted separately in the quantity of downlink control channel candidates; and
      monitor the downlink control channel according to a subset of the plurality of search space sets, wherein the subset of the plurality of search space sets excludes one or more of the plurality of search space sets based at least in part on the quantity of downlink control channel candidates satisfying a threshold.

2. The apparatus of claim 1, wherein:
   the configuration comprises a plurality of control resource sets, and
   the first downlink control channel candidate and the second downlink control channel candidate are each associated with a first control resource set of the plurality of control resource sets.

3. The apparatus of claim 1, wherein the instructions to determine the quantity of downlink control channel candidates are executable by the processor to cause the apparatus to:
   determine the quantity of downlink control channel candidates based at least in part on a respective aggregation level for each search space set of the plurality of search space sets.

4. The apparatus of claim 3, wherein the instructions to determine the quantity of downlink control channel candidates are executable by the processor to cause the apparatus to:
   determine, for each search space set of the plurality of search space sets, a respective second quantity of downlink control channel candidates based at least in part on the respective aggregation level and a respective total quantity of control channel elements for the search space set; and
   aggregate the respective second quantity of downlink control channel candidates for each search space set of the plurality of search space sets to calculate the quantity of downlink control channel candidates.

5. The apparatus of claim 4, wherein the respective second quantity of downlink control channel candidates for each search space set of the plurality of search space sets is determined based at least in part on dividing the respective total quantity of control channel elements by the respective aggregation level.

6. The apparatus of claim 4, wherein the respective second quantity of downlink control channel candidates is based at least in part on a minimum between the respective total quantity of control channel elements divided by the respective aggregation level and a respective total quantity of downlink control channel candidates configured for the search space set.

7. The apparatus of claim 1, wherein the first downlink control channel candidate is associated with a first search space set of the plurality of search space sets and the second downlink control channel candidate is associated with a second search space set of the plurality of search space sets.

8. The apparatus of claim 1, wherein the first downlink control channel candidate and the second downlink control channel candidate are each associated with a first search space set of the plurality of search space sets.

9. The apparatus of claim 1, wherein:
   each of the excluded one or more search space sets are UE-specific.

10. The apparatus of claim 9, wherein the subset of the plurality of search space sets includes one or more additional UE-specific search space sets distinct from the excluded one or more search space sets and one or more second search space sets common to multiple UEs.

11. An apparatus for wireless communication at a user equipment (UE), comprising:
a processor;
memory coupled with the processor; and
instructions stored in the memory and executable by the processor to cause the apparatus to:
receive a configuration of a plurality of search space sets for a downlink control channel;
determine a quantity of downlink control channel elements for monitoring over the plurality of search space sets, wherein a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements;
monitor the downlink control channel according to a subset of the plurality of search space sets, wherein the subset of the plurality of search space sets excludes one or more of the plurality of search space sets based at least in part on the quantity of downlink control channel elements satisfying a threshold.

12. The apparatus of claim 11, wherein the first downlink control channel element and the second downlink control channel element are each associated with a first search space set of the plurality of search space sets.

13. The apparatus of claim 11, wherein the instructions are further executable by the processor to cause the apparatus to:
receive a second configuration of a plurality of control resource sets for the downlink control channel, wherein the first downlink control channel element is associated with a first search space set of the plurality of search space sets and a first control resource set of the plurality of control resource sets, and wherein the second downlink control channel element is associated with a second search space set of the plurality of search space sets and the first control resource set.

14. The apparatus of claim 11, wherein the first downlink control channel element and the second downlink control channel element are associated with a same downlink control channel starting symbol.

15. The apparatus of claim 11, wherein:
each of the excluded one or more search space sets are UE-specific.

16. A method for wireless communication at a user equipment (UE), comprising:
receiving a configuration of a plurality of search space sets for a downlink control channel;
determining a quantity of downlink control channel candidates for monitoring over the plurality of search space sets, wherein a first downlink control channel candidate associated with a first set of control channel elements and a first payload size and a second downlink control channel candidate associated with the first set of control channel elements and the first payload size are each counted separately in the quantity of downlink control channel candidates; and
monitoring the downlink control channel according to a subset of the plurality of search space sets, wherein the subset of the plurality of search space sets excludes one or more of the plurality of search space sets based at least in part on the quantity of downlink control channel candidates satisfying a threshold.

17. The method of claim 16, wherein
the configuration comprises a plurality of control resource sets, and
the first downlink control channel candidate and the second downlink control channel candidate are each associated with a first control resource set of the plurality of control resource sets.

18. The method of claim 16, wherein determining the quantity of downlink control channel candidates comprises:
determining the quantity of downlink control channel candidates based at least in part on a respective aggregation level for each search space set of the plurality of search space sets.

19. The method of claim 18, wherein determining the quantity of downlink control channel candidates comprises:
determining, for each search space set of the plurality of search space sets, a respective second quantity of downlink control channel candidates based at least in part on the respective aggregation level and a respective total quantity of control channel elements for the search space set; and
aggregating the respective second quantity of downlink control channel candidates for each search space set of the plurality of search space sets to calculate the quantity of downlink control channel candidates.

20. The method of claim 19, wherein the respective second quantity of downlink control channel candidates for each search space set of the plurality of search space sets is determined based at least in part on dividing the respective total quantity of control channel elements by the respective aggregation level.

21. The method of claim 19, wherein the respective second quantity of downlink control channel candidates is based at least in part on a minimum between the respective total quantity of control channel elements divided by the respective aggregation level and a respective total quantity of downlink control channel candidates configured for the search space set.

22. The method of claim 16, wherein the first downlink control channel candidate is associated with a first search space set of the plurality of search space sets and the second downlink control channel candidate is associated with a second search space set of the plurality of search space sets.

23. The method of claim 16, wherein the first downlink control channel candidate and the second downlink control channel candidate are each associated with a first search space set of the plurality of search space sets.

24. The method of claim 16, wherein each of the excluded one or more search space sets are UE-specific.

25. The method of claim 24, wherein the subset of the plurality of search space sets includes one or more additional UE-specific search space sets distinct from the excluded one or more search space sets and one or more second search space sets common to multiple UEs.

26. A method for wireless communication at a user equipment (UE), comprising:
receiving a configuration of a plurality of search space sets for a downlink control channel;
determining a quantity of downlink control channel elements for monitoring over the plurality of search space sets, wherein a first downlink control channel element associated with a first downlink control channel candidate and a second downlink control channel element associated with a second downlink control channel candidate that overlaps at least partially in time and frequency with the first downlink control channel element are each counted separately in the quantity of downlink control channel elements;

monitoring the downlink control channel according to a subset of the plurality of search space sets, wherein the subset of the plurality of search space sets excludes one or more of the plurality of search space sets based at least in part on the quantity of downlink control channel elements satisfying a threshold.

27. The method of claim 26, wherein the first downlink control channel element and the second downlink control channel element are each associated with a first search space set of the plurality of search space sets.

28. The method of claim 26, further comprising:
receiving a second configuration of a plurality of control resource sets for the downlink control channel, wherein the first downlink control channel element is associated with a first search space set of the plurality of search space sets and a first control resource set of the plurality of control resource sets, and wherein the second downlink control channel element is associated with a second search space set of the plurality of search space sets and the first control resource set.

29. The method of claim 26, wherein the first downlink control channel element and the second downlink control channel element are associated with a same downlink control channel starting symbol.

30. The method of claim 26, wherein each of the excluded one or more search space sets are UE-specific.

* * * * *